（12）United States Patent
Kim et al.

(10) Patent No.: US 11,889,242 B2
(45) Date of Patent: Jan. 30, 2024

(54) DENOISING METHOD AND DENOISING DEVICE FOR REDUCING NOISE IN AN IMAGE

(71) Applicant: Samsung Electronics Co., Ltd., Suwon-si (KR)

(72) Inventors: Pilsu Kim, Hwaseong-si (KR); Seungwon Choi, Hwaseong-si (KR); Jongseong Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 17/531,089

(22) Filed: Nov. 19, 2021

(65) Prior Publication Data

US 2022/0368874 A1    Nov. 17, 2022

(30) Foreign Application Priority Data

Apr. 29, 2021    (KR) ........................ 10-2021-0055425

(51) Int. Cl.
| | |
|---|---|
| *H04N 9/79* | (2006.01) |
| *G06T 5/00* | (2006.01) |
| *G06T 3/40* | (2006.01) |
| *H04N 23/84* | (2023.01) |
| *H04N 25/13* | (2023.01) |

(52) U.S. Cl.
CPC ......... *H04N 9/7908* (2013.01); *G06T 3/4015* (2013.01); *G06T 5/002* (2013.01); *G06T 5/004* (2013.01); *H04N 23/843* (2023.01); *H04N 25/134* (2023.01); *G06T 2207/10024* (2013.01); *G06T 2207/20024* (2013.01)

(58) Field of Classification Search
CPC .. H04N 9/7908; H04N 25/134; H04N 23/843; G06T 3/4015; G06T 5/002; G06T 5/004; G06T 2207/10024; G06T 2207/20024
See application file for complete search history.

(56) References Cited

U.S. PATENT DOCUMENTS

| | | |
|---|---|---|
| 6,229,578 B1 | 5/2001 | Acharya et al. |
| 8,164,661 B2 | 4/2012 | Park et al. |
| 8,218,898 B2 | 7/2012 | Subbotin |
| 9,287,316 B2 | 3/2016 | Mlinar |

(Continued)

FOREIGN PATENT DOCUMENTS

| | | |
|---|---|---|
| KR | 1020010032809 A | 4/2001 |
| KR | 1020080055091 A | 6/2008 |

*Primary Examiner* — Thai Q Tran
*Assistant Examiner* — Jose M Mesa
(74) *Attorney, Agent, or Firm* — Muir Patent Law, PLLC

(57) ABSTRACT

A method of reducing noise in an input image by setting, as a local window among color pixels included in the input image, a target pixel and neighboring pixels adjacent to the target pixel, determining color pixel values for the target pixel and each of the neighboring pixels included in the local window, generating local color average values are generated by averaging, color by color, the color pixel values, generating offset color pixel values by converting the color pixel values of the target pixel and the neighboring pixels based on the local color average values, and generating a compensated color pixel value of the target pixel by adjusting the color pixel value of the target pixel based on the offset color pixel values.

20 Claims, 20 Drawing Sheets

(56) References Cited

U.S. PATENT DOCUMENTS

| | | |
|---|---|---|
| 10,148,926 B2 | 12/2018 | Getman et al. |
| 10,210,600 B2 | 2/2019 | Baek |
| 2006/0232823 A1* | 10/2006 | Hooper .................... G06T 5/20 358/3.27 |
| 2007/0133893 A1 | 6/2007 | Jerdev |
| 2009/0284627 A1* | 11/2009 | Bando .................. H04N 23/843 382/173 |
| 2011/0085729 A1 | 4/2011 | Shi et al. |
| 2015/0054990 A1* | 2/2015 | Aoki ........................ G06T 5/20 348/241 |
| 2015/0206280 A1* | 7/2015 | Ono .................... H04N 23/843 348/223.1 |
| 2020/0260001 A1 | 8/2020 | Douady-Pleven et al. |
| 2021/0342981 A1* | 11/2021 | Lin ........................ G06T 5/003 |

* cited by examiner

620

| UPTT | UPTT | UPTT |
|------|------|------|
| UPTT | UPTT | UPTT |
| UPTT | UPTT | UPTT |

DENOISING METHOD AND DENOISING DEVICE FOR REDUCING NOISE IN AN IMAGE

CROSS-REFERENCE TO RELATED APPLICATION

This U.S. non-provisional application claims priority under 35 USC § 119 to Korean Patent Application No. 10-2021-0055425, filed on Apr. 29, 2021, in the Korean Intellectual Property Office (KIPO), the disclosure of which is incorporated by reference herein in its entirety.

BACKGROUND

1. Technical Field

Example embodiments relate generally to image processing, and more particularly to a denoising method and a denoising device for reducing noise in an input image corresponding to a color filter array of an image sensor.

2. Discussion of the Related Art

Complementary metal oxide semiconductor (CMOS) image sensors are solid-state sensing devices that use complementary metal oxide semiconductors. CMOS image sensors have lower manufacturing costs and lower power consumption compared with charge-coupled device (CCD) image sensors. Thus CMOS image sensors are used for various electronic appliances including portable devices such as, for example, smartphones and digital cameras.

A pixel array included in a CMOS image sensor may include a photoelectric conversion element in each pixel. The photoelectric conversion element generates an electrical signal that varies based on the quantity of incident light. The CMOS image sensor processes these electrical signals to synthesize an image. With the recent proliferation of high-resolution images, pixels included in the CMOS image sensor are becoming much smaller. However, when the pixels get smaller, incident light may not be properly sensed or noise may occur due to interference between highly integrated elements.

SUMMARY

Some example embodiments may provide a denoising method and a denoising device, capable of efficiently reducing noise in an input image corresponding to a color filter array of an image sensor.

According to example embodiments, there is provided a method of reducing noise in an input image corresponding to a color filter array of an image sensor. The method comprising setting, as a local window among color pixels included in the input image, a target pixel and neighboring pixels adjacent to the target pixel, determining color pixel values for the target pixel and each of the neighboring pixels included in the local window, generating local color average values by averaging, color by color, the color pixel values, generating offset color pixel values by converting the color pixel values of the target pixel and the neighboring pixels based on the local color average values, and generating a compensated color pixel value of the target pixel by adjusting the color pixel value of the target pixel based on the offset color pixel values.

According to example embodiments, there is provided a device for reducing noise in an input image corresponding to a color filter array of an image sensor. The device comprising a local window generator configured to set, as a local window among color pixels included in the input image, a target pixel and neighboring pixels adjacent to the target pixel, and provide color pixel values for the target pixel and each of the neighboring pixels included in the local window, an average value generator configured to generate local color average values by averaging, color by color, the color pixel values, a converter configured to generate offset color pixel values by converting the color pixel values of the target pixel and the neighboring pixels based on the local color average values, and a compensator configured to generate a compensated color pixel value of the target pixel by adjusting the color pixel value of the target pixel based on the offset color pixel values.

According to example embodiments, there is provided a method of reducing noise in an input image corresponding to a color filter array of an image sensor. The method comprising setting, as a local window among color pixels included in the input image, a target pixel and neighboring pixels adjacent to the target pixel, generating edge information by detecting edges included in the input image, determining color pixel values for the target pixel and each of the neighboring pixels included in the local window, generating local color average values by averaging, color by color, the color pixel values, generating offset color pixel values by converting the color pixel values of the target pixel and the neighboring pixels based on the local color average values, and generating a compensated color pixel value of the target pixel by adjusting the color pixel value of the target pixel based on the edge information and the offset color pixel values.

The method and the device according to example embodiments may enhance noise reduction performance by adjusting the color pixel value of the target pixel in accordance with the color pixel values corresponding to all colors included in the local window regardless of the color of the target pixel.

In addition, the method and the device according to example embodiments may enhance the noise reduction performance without color distortion by generating the offset color pixel values based on the local color average values and adjusting the color pixel values of the target pixel based on the offset color pixel values.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
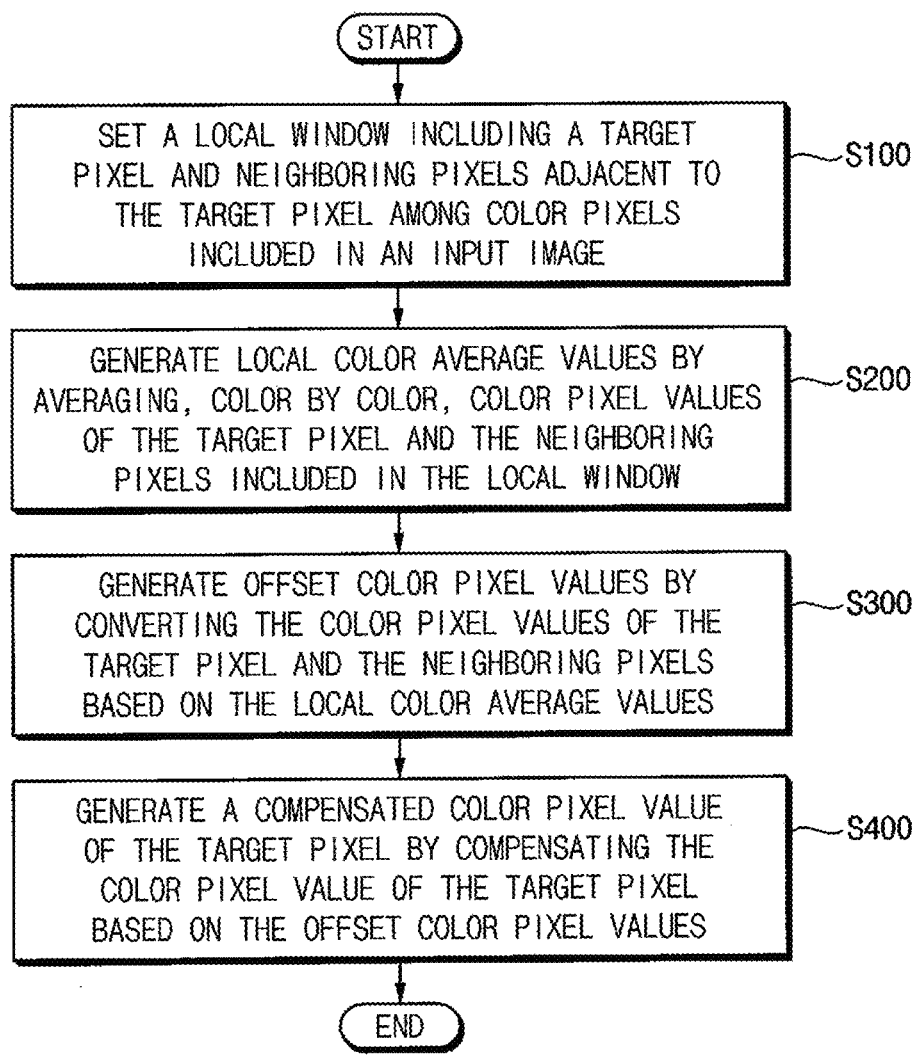
FIG. 1 is a flowchart illustrating a denoising method according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flowchart illustrating a denoising (e.g., reducing noise) method according to example embodiments.

Referring to FIG. 1, a local window including a target pixel and neighboring pixels adjacent to the target pixel may be set among color pixels included in an input image (S100). The input image may correspond to a color filter array of an image sensor that generates the input image. The color filter array may be a mosaic of tiny color filers placed over the image sensor to capture color information. Each filter within the mosaic may cover one pixel (i.e., "sensor element" or "pixel sensor") in the image sensor. Each filter in combination with the pixel that the filter covers may generate a color pixel included in the input image Different types of color filter arrays, such as the Bayer filter mosaic, are discussed in further detail below. The local window may be an area or region of the input image. The size of the local window may be determined depending on kind and characteristics of the input image, a required noise reduction performance, and so on. For example, the local window may have m*n size such that the local window includes m*n color pixels or m*n color pixel values that are arranged in a matrix form of m rows and n columns. A color pixel centered in the local window corresponds to the target pixel and the other color pixels in the local window correspond to the neighboring pixels.

Hereinafter, compensation of one target pixel in one local window is described, and it will be easily understood that all color pixels in the input image may be compensated sequentially by selecting each color pixel as the target pixel by moving the local window having a fixed size in a row direction and a column direction.

Local color average values may be generated by averaging, color by color, color pixel values of the target pixel and the neighboring pixels included in the local window (S200). The input image may be represented by colors corresponding to the colors of the color filter array, and the local color average value may be obtained per color, for example, color by color. For example, when the color filter array has a Bayer pattern including red pixel values, green pixel values and blue pixel values, the local color average values may include a local red average value, a local green average value and a local blue average value.

Offset color pixel values may be generated by converting the color pixel values of the target pixel and the neighboring pixels based on the local color average values (S300). In some example embodiments, color offset values may be generated by subtracting each of the local color average values from a target color average value that is the local color average value corresponding to a color of the target pixel, and each of the offset color pixel values may be generated by adding each of the color pixel values of the target pixel and the neighboring pixels to each of the color offset values. In this case, an average value of the offset color pixel values corresponding to each color is equal to a target color average value that is the local color average value corresponding to a color of the target pixel.

A compensated color pixel value of the target pixel may be generated by adjusting the color pixel value of the target pixel based on the offset color pixel values (S400). In some example embodiments, a weighted average value may be generated by applying weight values to the offset color pixel values with respect to all of the target pixel and the neighboring pixels in the local window and the weighted average value may be provided as the compensated color pixel value of the target pixel.

As such, the denoising method and the denoising device according to example embodiments may enhance noise reduction performance by adjusting the color pixel value of the target pixel in accordance with the color pixel values corresponding to all colors included in the local window regardless of the color of the target pixel. In addition, the denoising method and the denoising device according to example embodiments may enhance the noise reduction performance without color distortion by generating the offset color pixel values based on the local color average values and adjusting the color pixel values of the target pixel based on the offset color pixel values.

Figure 2:
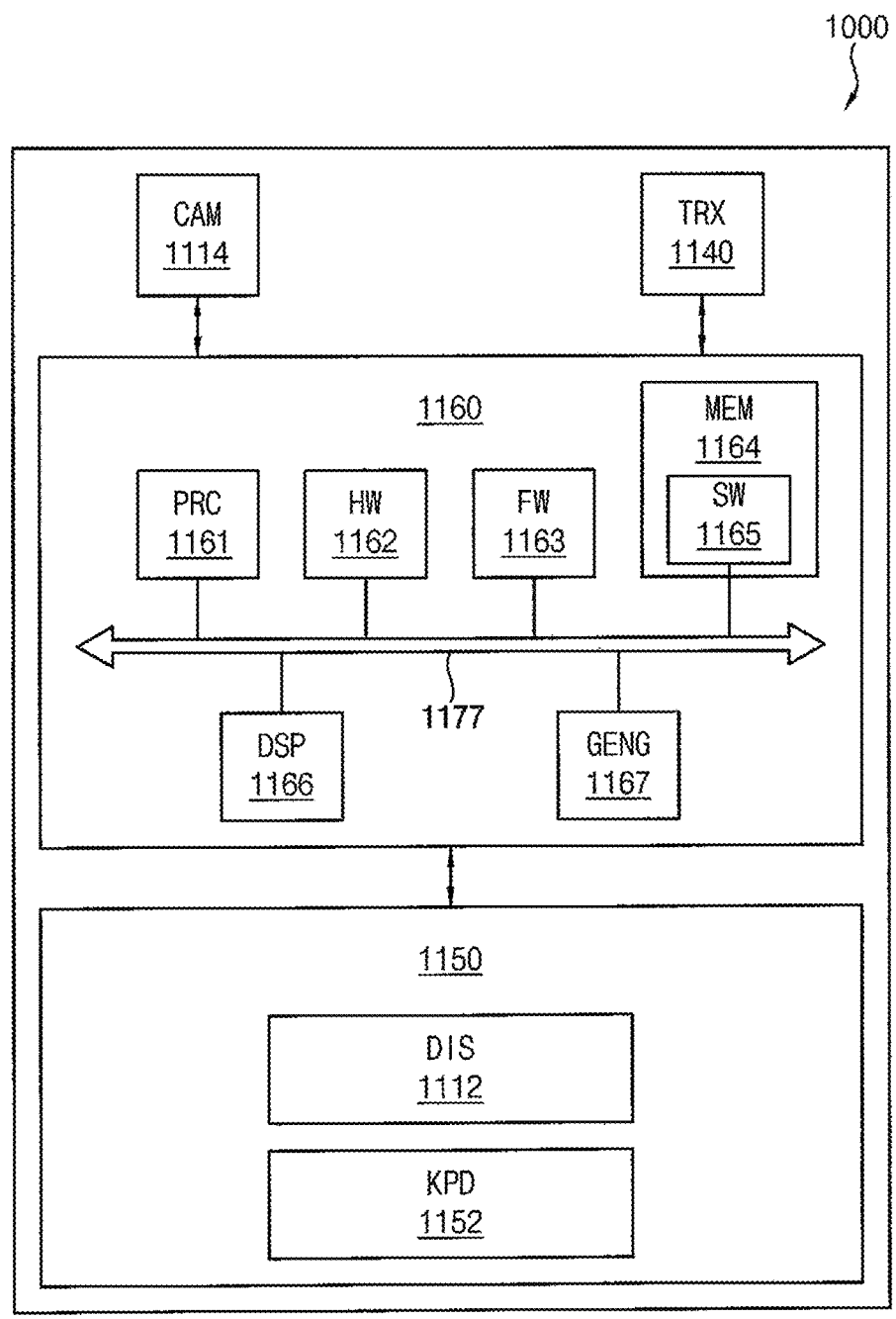
FIG. 2 is a block diagram illustrating a system according to example embodiments.

FIG. 2 is a block diagram illustrating a system 1000 according to example embodiments.

Referring to FIG. 2, the system 1000 may include camera module CAM 1114, a transceiver TRX 1140, a control unit 1160 and a user interface 1150.

The camera module 1114 may include a camera and/or an image sensor to capture and provide images. In some example embodiments, the camera module 1114 may include a plurality of cameras to capture a plurality of input images to be merged. In some example embodiments, the camera module 1114 may provide a plurality of input images to be merged where the plurality of input images are captured by a single camera.

The transceiver 1140 may provide connectivity through wired or wireless links to other networks such as an internet, a cellular network, etc.

The user interface 1150 may include input devices KPD 1152 such as a keyboard, a keypad, etc. and a display device DSP 1112 to display images. In some examples, a virtual keypad or keyboard may be integrated into the display device 1112 with a touch screen/sensor or the like.

The control unit 1160 may include a general purpose processor PRC 1161, a hardware device HW 1162, a firmware device FW 1163, a memory MEM 1164, a digital signal processor DSP 1166, a graphics engine GENG 1167, and a bus 1177. The control unit 1160 may perform the denoising method according to example embodiments. For example, the control unit 1160 may be configured to perform functions of the denoising device as will be described below with reference to FIGS. 8 and 17.

Example embodiments may be implemented as hardware, software, firmware, or a combination thereof.

In some example embodiments, the denoising method according to example embodiments may be performed by the digital signal processor 1166. For example, the denoising device as will be described below with reference to FIGS. 8 and 17 may include or may be included in the digital signal processor 1166. In some example embodiments, the denoising method according to example embodiments may be performed by calculation circuits included in a graphic processing unit (GPU), a neural processing unit (NPU), an image signal processor (ISP), a central processing unit (CPU), and so on.

In some example embodiments, at least a portion of the methods according to example embodiments may be performed by program instructions that are executed by a processing device. The program instructions may be stored in the memory 1164 as software SW 1165, and the program instructions may be executed by the general purpose processor 1161 and/or the digital signal processor 1166.

In some example embodiments, to execute the program instructions, the general purpose processor 1161 may retrieve or fetch the program instructions from an internal register, an internal cache, or the memory 1164 and decode and execute the instructions. During or after execution of the program instructions, the general purpose processor 1161 may write one or more results (which may be intermediate or final results) of the program instructions to the internal register, internal cache, or the memory 1164.

The system 1000 may be a computer system taking any suitable physical form. For example, the system 1000 may be an embedded computer system, a system-on-chip (SOC), a single-board computer system (SBC) such as a computer-on-module (COM) or system-on-module (SOM), a desktop computer system, a laptop or notebook computer system, an interactive kiosk, a mainframe, a mesh of computer systems, a mobile telephone, a personal digital assistant (PDA), a server, a tablet computer system, or a combination of two or more of these.

The program instruction for implementing methods according to example embodiments may be stored in a computer-readable non-transitory storage medium or media. The computer-readable non-transitory storage medium may include one or more semiconductor-based or other integrated circuits (ICs) such as field-programmable gate arrays (FPGAs) or application-specific ICs (ASICs), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 3:
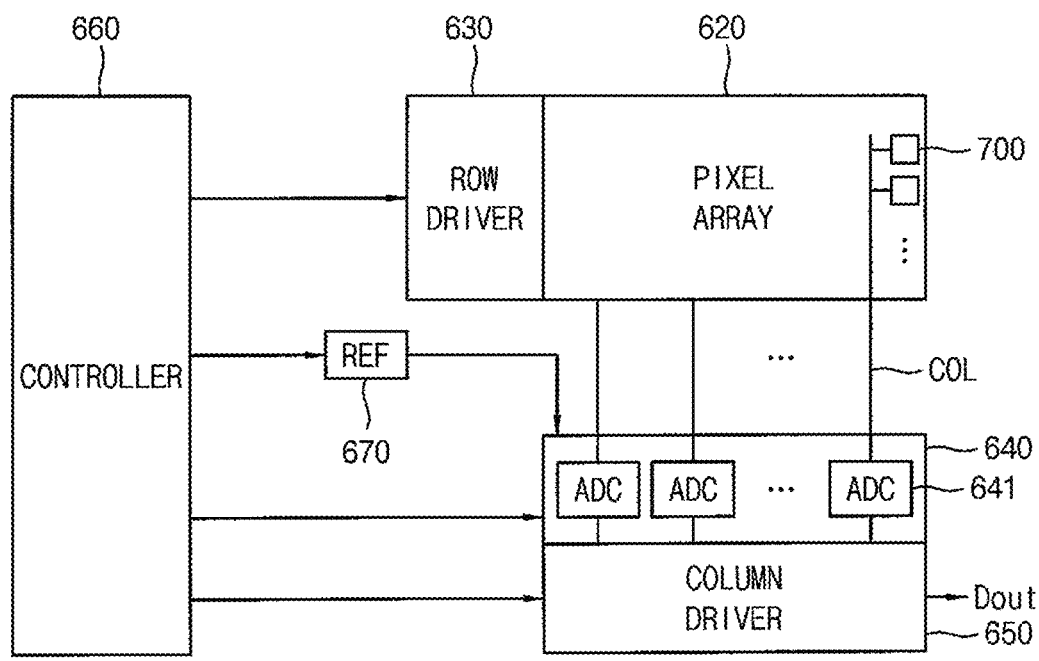
FIG. 3 is a block diagram illustrating an image sensor according to example embodiments.

FIG. 3 is a block diagram illustrating an image sensor 600 according to example embodiments.

Referring to FIG. 3, the image sensor 600 may include a pixel array 620, a row driver 630, an analog-to-digital conversion circuit 640, a column driver 650, a controller 660, and a reference signal generator REF 670.

Figure 6:
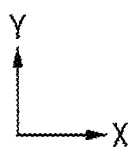
FIG. 6 is a diagram illustrating a layout of a pixel array according to example embodiments.
Figure 7:
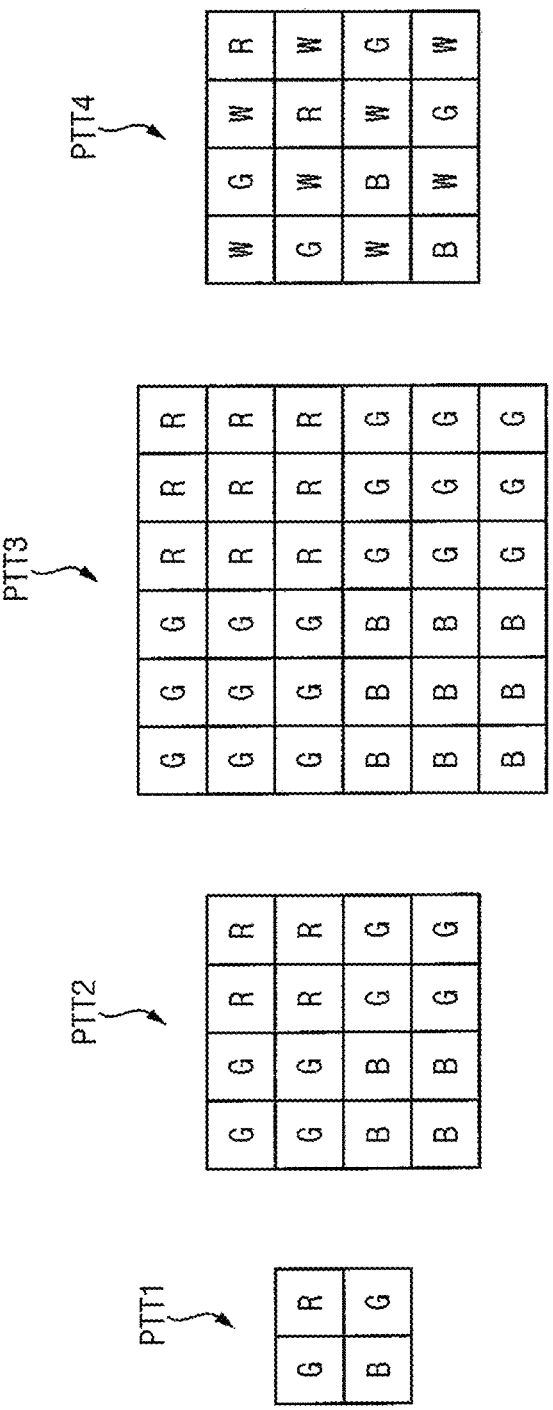
FIG. 7 is a diagram illustrating example embodiments of a unit pattern in the layout of FIG. 6.

The pixel array 620 includes a plurality of pixels 700 coupled to column lines COL, respectively, and the plurality of pixels 700 senses incident light to generate analog signals through the column lines COL. The plurality of pixels 700 may be arranged in matrix form with a plurality of rows and a plurality of columns. The pixel array 620 may have a structure wherein various unit patterns, which will be described below with reference to FIGS. 6 and 7, are arranged repeatedly in the first horizontal direction X and the second horizontal direction Y.

The row driver 630 may be coupled to the rows of the pixel array 620 to generate signals for driving the rows. For example, the row driver 630 may drive the pixels in the pixel array 620 row by row.

The analog-to-digital conversion circuit 640 may be coupled to the columns of the pixel array 620 to convert the analog signals from the pixel array 620 to digital signals. As illustrated in FIG. 3, the analog-to-digital conversion circuit 640 may include a plurality of analog-to-digital converters (ADC) 641 to perform analog-to-digital conversion of the analog signals output from the column lines COL in parallel or simultaneously.

The analog-to-digital conversion circuit 640 may include a correlated double sampling (CDS) unit. In some example embodiments of the present disclosure, the CDS unit may perform an analog double sampling by extracting a valid image component based on a difference between an analog reset signal and an analog image signal. In some example embodiments of the present disclosure, the CDS unit may perform a digital double sampling by converting the analog reset signal and the analog image signal to two digital signals and extracting a difference between the two digital signals as the valid image component. In some example embodiments of the present disclosure, the CDS unit may perform a dual CDS by performing both the analog double sampling and digital double sampling.

The column driver 650 may output the digital signals from the analog-to-digital conversion circuit 640 sequentially as output data Dout.

The controller 660 may control the row driver 630, the analog-to-digital conversion circuit 640, the column driver 650, and the reference signal generator 670. The controller 660 may provide control signals such as clock signals, timing control signals, etc. required for the operations of the row driver 630, the analog-to-digital conversion circuit 640, the column driver 650, and the reference signal generator 670. The controller 660 may include a control logic circuit, a phase-locked loop, a timing control circuit, a communication interface circuit, etc.

The reference signal generator 670 may generate a reference signal or a ramp signal that increases or decreases gradually and provide the ramp signal to the analog-to-digital conversion circuit 640.

Figure 4:
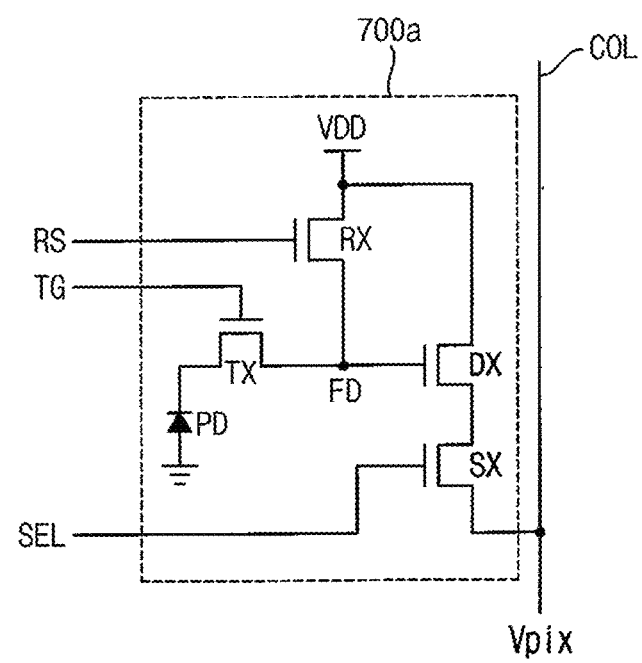
FIG. 4 is a circuit diagram illustrating an example of a pixel included in an image sensor according to example embodiments.

FIG. 4 is a circuit diagram illustrating an example of a unit pixel 700a included in an image sensor according to example embodiments.

Referring to FIG. 4, the unit pixel 700a may include a photo-sensitive element such as a photodiode PD, and a readout circuit including a transfer transistor TX, a reset transistor RX, a drive transistor DX and/or a selection transistor SX.

For example, the photodiode PD may include an n-type region in a p-type substrate such that the n-type region and the p-type substrate form a p-n conjunction diode. The photodiode PD receives the incident light and generates a photo-charge based on the incident light. In some example embodiments, the unit pixel 600a may include a phototransistor, a photogate, and/or a pinned photodiode, etc. instead of, or in addition to, the photodiode PD.

The photo-charge generated in the photodiode PD may be transferred to a floating diffusion node FD through the transfer transistor TX. The transfer transistor TX may be turned on in response to a transfer control signal TG.

The drive transistor DX functions as a source follower amplifier that amplifies a signal corresponding to the charge on the floating diffusion node FD. The selection transistor SX may transfer the pixel signal Vpix to a column line COL in response to a selection signal SEL.

The floating diffusion node FD may be reset by the reset transistor RX. For example, the reset transistor RX may discharge the floating diffusion node FD in response to a reset signal RS for correlated double sampling (CDS).

FIG. 4 illustrates the unit pixel 700a of the four-transistor configuration including the four transistors TX, RX, DX and SX. The configuration of the unit pixel may be variously changed and the pixel structure is not limited to that of FIG. 4.

Figure 5:
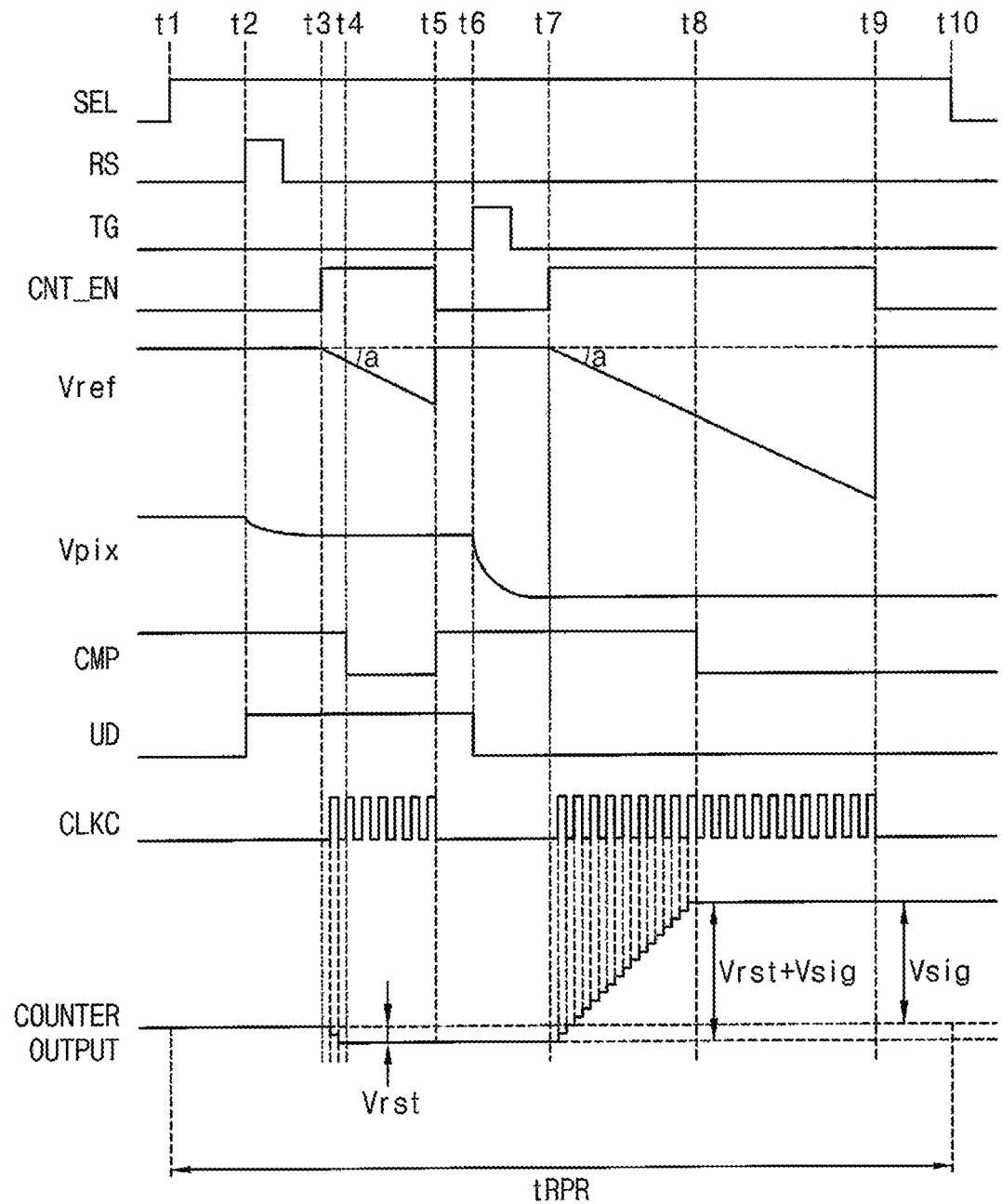
FIG. 5 is a timing diagram illustrating an operation of an image sensor according to example embodiments.

FIG. 5 is a timing diagram illustrating an operation of an image sensor according to example embodiments.

FIG. 5 illustrates a sensing period tRPR corresponding to a sensing operation of a pixel. The sensing operation may be performed simultaneously with respect to pixels corresponding to the same transfer control signal TG.

Referring to FIGS. 3, 4 and 5, at a time t1, the row driver 630 may select one of rows included in the pixel array 620 by providing an activated row selection signal SEL to the selected row of the pixel array 620. Here, for example, the row selection signal SEL may transition from low to high.

At a time t2, the row driver 630 may provide an activated reset control signal RS to the selected row, and the controller 660 may provide an up-down control signal UD having a logic high level to a counter included in the ADC 641. From the time t2, the pixel array 620 may output a first analog signal corresponding to a reset component Vrst as the pixel voltage Vpix.

At a time t3, the controller 660 may provide a count enable signal CNT_EN having a logic high level to the reference signal generator 670, and the reference signal generator 670 may start to decrease the reference signal Vref at a constant rate, e.g., a slope of 'a'. The controller 660 may provide a count clock signal CLKC to the counter included in the ADC 641, and the counter may perform down-counting from zero in synchronization with the count clock signal CLKC.

At a time t4, a magnitude of the reference signal Vref may become smaller than a magnitude of the pixel voltage Vpix, and a comparator included in the ADC 641 may provide a comparison signal CMP having a logic low level to the counter so that the counter stops performing the down-counting. At the time t4, a counter output of the counter may be the first counting value that corresponds to the reset component Vrst. In the example of FIG. 5, the counter output of the counter at the time t4 may be −2.

At a time t5, the controller 660 may provide the count enable signal CNT_EN having a logic low level to the reference signal generator 670, and the reference signal generator 670 may stop generating the reference signal Vref.

A period from the time t3 to the time t5 corresponds to a maximum time for detecting the reset component Vrst. A length of the period from the time t3 to the time t5 may be determined as a certain number of the count clock signal CLKC according to a characteristic of the image sensor 700.

At a time t6, the row driver 630 may provide an activated transfer control signal TG (e.g., the transfer control signal TG having a logic high level) to the selected row, and the controller 660 may provide the up-down control signal UD having a logic low level to the counter. From the time t6, the pixel array 620 may output a second analog signal corresponding to a detected incident light Vrst+Vsig as the pixel voltage Vpix.

At a time t7, the controller 660 may provide the count enable signal CNT_EN having a logic high level to the reference signal generator 670, and the reference signal generator 670 may start to decrease the reference signal Vref at the same constant rate as at the time t3, e.g., a slope of 'a'. The comparator in the ADC 641 may provide the comparison signal CMP having a logic high level to the counter since the pixel voltage Vpix is smaller than the reference signal Vref. The controller 660 may provide the count clock signal CLKC to the counter, and the counter may perform an up-counting from the first counting value, which corresponds to the reset component Vrst, in synchronization with the count clock signal CLKC.

At a time t8, the magnitude of the reference signal Vref may become smaller than the magnitude of the pixel voltage Vpix, and the comparator may provide the comparison signal CMP having a logic low level to the counter so that the counter stops performing the up-counting. At the time t8, the counter output of the counter may correspond to a difference between the first analog signal representing the reset component Vrst (e.g., −2 in the example of FIG. 5) and the second analog signal representing the detected incident light Vrst+Vsig (e.g., 17 in the example of FIG. 5). The difference may be an effective intensity of incident light Vsig (e.g., 15 in the example of FIG. 5). The counter may output the effective intensity of incident light Vsig as the digital signal.

At a time t9, the controller 660 may provide the count enable signal CNT_EN having a logic low level to the reference signal generator 670, and the reference signal generator 670 may stop generating the reference voltage Vref.

A period from the time t7 to the time t9 corresponds to a maximum time for detecting the detected incident light Vrst+Vsig. A length of the period from the time t7 to the time t9 may be determined as a certain number of the count clock signal CLKC according to a characteristic of the image sensor 700.

At a time t10, the row driver 630 may provide a deactivated row selection signal SEL (e.g., the row selection signal having a low level) to the selected row of the pixel array 620, and the counter may reset the counter output to zero.

After that, the image sensor 700 may repeat above described operations on each row to generate the digital signals row by row.

The present disclosure is not limited to the example configuration and operation described with reference to FIGS. 3, 4 and 5.

FIG. 6 a diagram illustrating a layout of a pixel array 620 according to example embodiments.

Referring to FIG. 6, the pixel array 620 in the image sensor 600 of FIG. 3 may be divided into unit patterns UPTT that are arranged repeatedly in the row direction X and the column direction Y. In some example embodiments, all of the unit patterns UPTT in the pixel array 620 may be identical. In this case, the unit pattern UPTT is a minimum pattern that cannot be divided into smaller patterns. In some example embodiments, the unit patterns UPTT in the pixel array 620 may include two or more different patterns such that the different patterns are arranged regularly in the first horizontal direction DR1 and/or the second horizontal direction DR2.

Hereinafter, various color filter array and unit patterns according to example embodiments are described with reference to FIG. 7. The unit pattern may be inverted in the row direction X and/or the column direction Y, or the unit pattern may be rotated around the vertical direction by 90 degrees or 180 degrees.

FIG. 7 is a diagram illustrating example embodiments of a unit pattern in the layout of FIG. 6.

FIG. 7 illustrates, as non-limiting examples, unit patterns of a Bayer pattern PTT1, a Tetra pattern PTT2, a Nona pattern PTT3 and an RGBW pattern PTT4. The pixel array may include a plurality of unit patterns, in other words, a plurality of color pixels arranged regularly. Example embodiments are not limited to the unit patterns illustrated in FIG. 7 and example embodiments may be applied any color filter array of various patterns.

Referring to FIG. 7, the unit pattern of a Bayer pattern PTT1 may comprise a 2×2 unit that includes one red pixel R, two green pixels G and one blue pixel B. The unit pattern of a Tetra pattern PTT2 may comprise a 4×4 unit that includes four red pixels R, eight green pixels G and four blue pixels B. The unit pattern of a Nona pattern PTT3 may comprise a 6×6 unit that includes nine red pixels R, eighteen green pixels G and nine blue pixels B. The unit pattern of a RGBW pattern PTT4 may comprise a 4×4 unit that includes eight white pixels W, two red pixels R, four green pixels G and two blue pixels B.

Hereinafter, example embodiments are described based on the Bayer pattern, but example embodiments are not limited thereto. Example embodiments may be applied to any other patterns including the Tetra pattern PTT2, the Nona pattern PTT3, the RGBW pattern PTT4, and so on.

Figure 8:
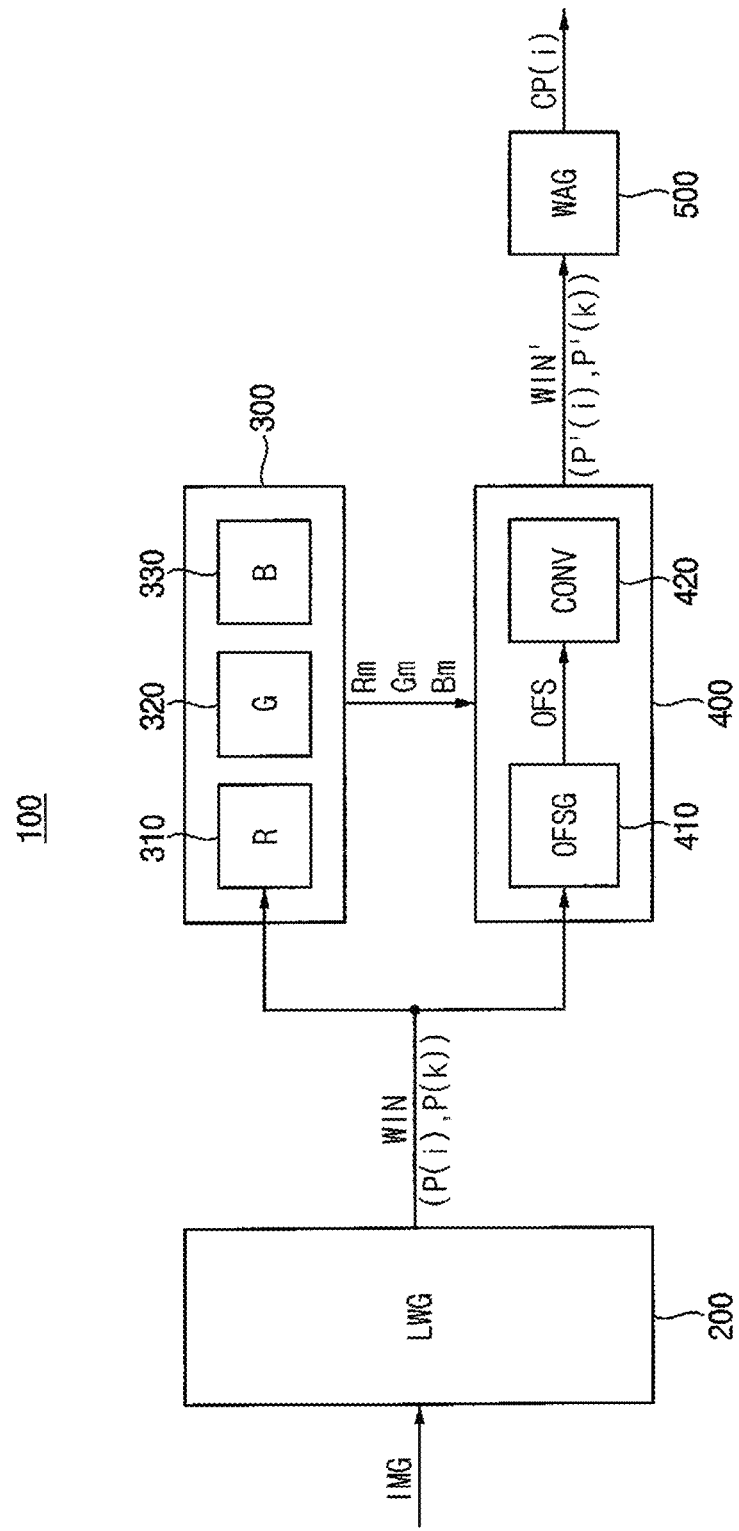
FIG. 8 is a block diagram illustrating a denoising device according to example embodiments.

FIG. 8 is a block diagram illustrating a denoising device 100 according to example embodiments.

Referring to FIG. 8, the denoising device 100 may include a local window generator LWG 200, an average value generator 300, a convertor 400 and a compensator WAG 500.

The local window generator 200 may set a local window WIN including a target pixel P(i) and neighboring pixels P(k) adjacent to the target pixel P(i) among color pixels included in an input image IMG, and provide color pixel values of the target pixel P(i) and the neighboring pixels P(k). Hereinafter, P(i) may represent the target pixel or the color pixel value of the target pixel. In addition, P(k) may represent the neighboring pixels and the color pixel values of the neighboring pixels. When k=i, P(k) may indicate the target pixel P(i). The setting of the local window WIN will be further described below with reference to FIG. 9.

The average value generator 300 may generate local color average values by averaging, color by color, the color pixel values of the target pixel P(i) and the neighboring pixels P(k) included in the local window WIN. The average value generator 300 may include a plurality of color average value generators 310, 320 and 330 generating the local color average values, respectively.

In some example embodiments, when the input image IMG has the Bayer pattern including red pixel values, green pixel values and blue pixel values, the average value generator 300 may include a red average value generator 310, a green average value generator 320 and a blue average value generator 330. The red average value generator 310 may generate a local red average value Rm by averaging the red pixel values in the local window WIN. The green average value generator 320 may generate a local green average value Gm by averaging the green pixel values in the local window WIN. The blue average value generator 330 may generate a local blue average value Bm by averaging the blue pixel values in the local window WIN.

In case of the Bayer pattern, the local color average values may be represented by Expression 1.

$$Rm = \frac{1}{Nr} \sum_{i \in WIN} R(i)$$

$$Gm = \frac{1}{Ng} \sum_{i \in WIN} G(i)$$

$$Bm = \frac{1}{Nb} \sum_{i \in WIN} B(i)$$

Expression 1

In Expression 1, $$\sum_{i \in WIN}$$

indicates a sum with respect to the color pixels in the local window WIN, Rm indicates the local red average value, Gm indicates the local green average value, Bm indicates the local blue average value, Nr indicates the number of red pixels R(i) in the local window WIN, Ng indicates the number of green pixels G(i) in the local window WIN, and Nb indicates the number of blue pixels R(i) in the local window WIN.

The converter 400 may generate offset color pixel values P'(i) and P'(k) by converting the color pixel values of the target pixel P(i) and the neighboring pixels P(k) based on the local color average values Rm, Gm and Bm. In some example embodiments, the converter 400 may include an offset generator OFSG 410 and a pixel value converting unit CONV 420.

The offset generator 410 may generate each of the color offset values OFS by subtracting each of the local color average values Rm, Gm and Bm from a target color average value that is the local color average value corresponding to a color of the target pixel P(i). The pixel value converting unit 420 may generate each of the offset color pixel values P'(i) and P'(k) by adding each of the color pixel values of the target pixel P(i) and the neighboring pixels P(k) to each of the color offset values OFS, respectively. Each color offset value may be represented by Expression 2.

$$OFSc1c2 = C1m - C2m$$

Expression 2

In Expression 2, OFSc1c2 indicates the color offset value corresponding to a second color C2 when the target pixel P(i) corresponds to a first color C1. C1m indicates the local color average value corresponding to the first color and C2m indicates the local color average value corresponding to the second color. For example, OFSrg indicates the local color average value corresponding to the green pixel values when the target pixel P(i) is the red pixel.

The compensator 500 may generate a compensated color pixel value CP(i) of the target pixel P(i) by compensating the color pixel value of the target pixel P(i) based on the offset color pixel values P'(i) and P'(k).

In some example embodiments, with respect to all color pixels in the local window WIN' including the target pixel P(i) and the neighboring pixels P(k), the compensator 500 may generate a weighted average value by applying weight values to the offset color pixel values, and provide the weighted average value as the compensated color pixel value CP(i) value of the target pixel P(i). In this case, the compensated color pixel value CP(i) of the target pixel P(i) may be represented by Expression 3.

$$CP(i) = \frac{\sum_k \omega_i(k) \cdot P'(k)}{\sum_k \omega_i(k)}$$

Expression 3

In Expression 3, $\Sigma k$ indicates a sum with respect to all of color pixel values, for example, the target pixel P(i) and the neighboring pixels P(k) in the local window WIN', P'(k) indicates each offset color pixel value, and $\omega i(k)$ indicates each weight value corresponding to each offset color pixel value P'(k).

In some example embodiments, each weight value $\omega i(k)$ may be represented by Expression 4.

$$\omega_i(k) = e^{-\frac{|P(i)-P'(k)|}{h}}$$

Expression 4

In Expression 4, where P(i) indicates the color pixel value of the target pixel, P'(k) indicates each offset color pixel value, h indicates a noise reduction strength, and $\omega i(k)$ indicates each weight value corresponding to each offset color pixel value P'(k). The noise reduction strength h may be determined depending on kind and characteristics of the input image, a required noise reduction performance, and so on.

Figure 9:
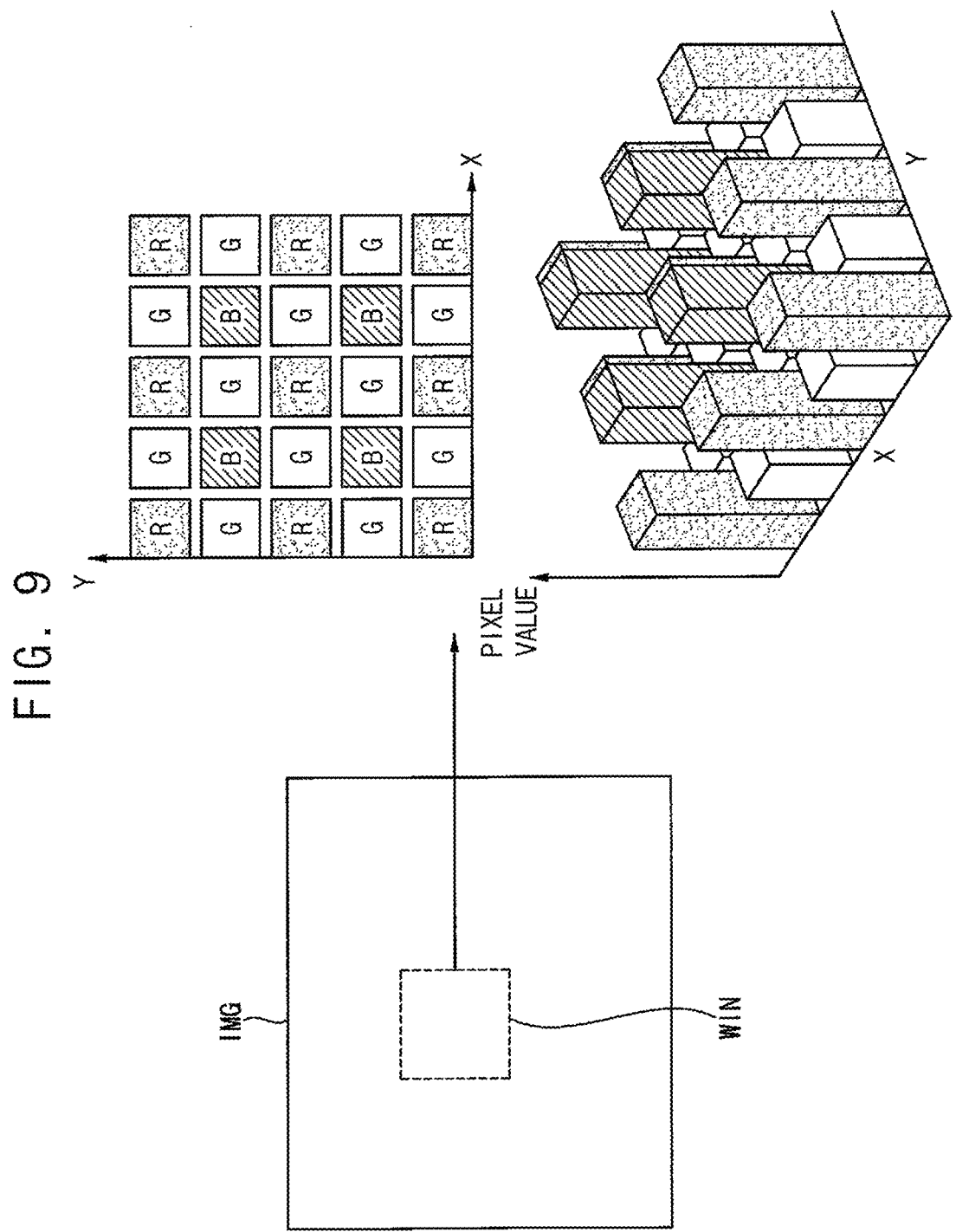
FIG. 9 is a diagram for describing a local window used in a denoising method according to example embodiments.

FIG. 9 is a diagram for describing a local window used in a denoising method according to example embodiments.

As an example, FIG. 9 illustrates a local window WIN and an input image IMG generated from a monochromatic test board of a purple color using an image sensor including a color filter array of the Bayer pattern.

The red pixel values R, the green pixel values G and the blue pixel values are determined by the light reflected by an object, e.g., the monochromatic test board. The color pixel centered in the local window WIN corresponds to the target pixel to which the denoising method is applied. In case of FIG. 9, the red pixel corresponds to the target pixel.

It may be assumed that the color pixel values of the input image IMG may have distributions of averages and variations per color as will be described below with reference to FIGS. 10 through 15. Here, the variations in the color pixel values per color may be determined by noises in case of the monochromatic object.

When the pixels of the different colors are used in denoising, the final output image may result in color distortion if the average color pixel value is changed after denoising. According to example embodiments, a local channel compensation may be applied using the local window such that the average color pixel value in the compensated image may not be changed even though the pixel values corresponding to different colors from the target pixel are used in denoising. Such local channel compensation will be further described with reference to FIGS. 10 through 15.

Figure 10:
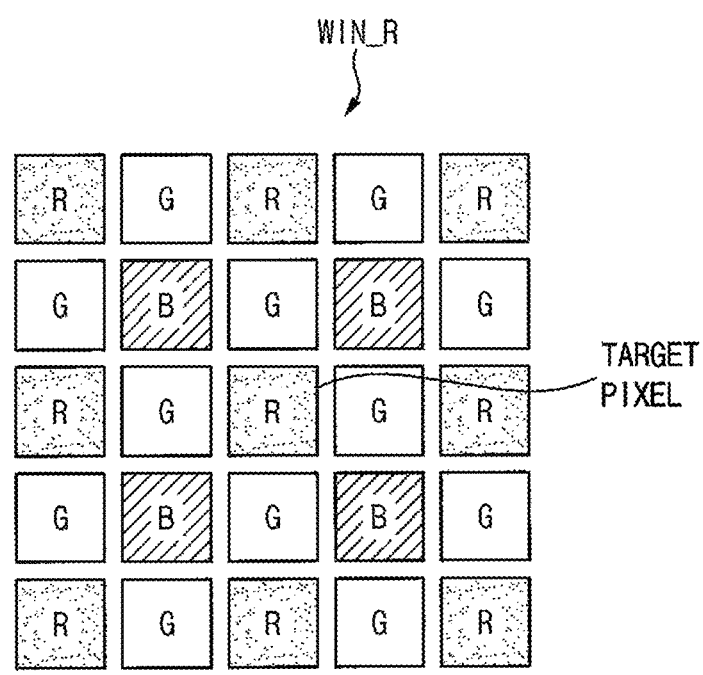
FIG. 10 is a diagram illustrating an example embodiment of a local window when a target pixel corresponds to a red pixel in a Bayer pattern.
Figure 11:
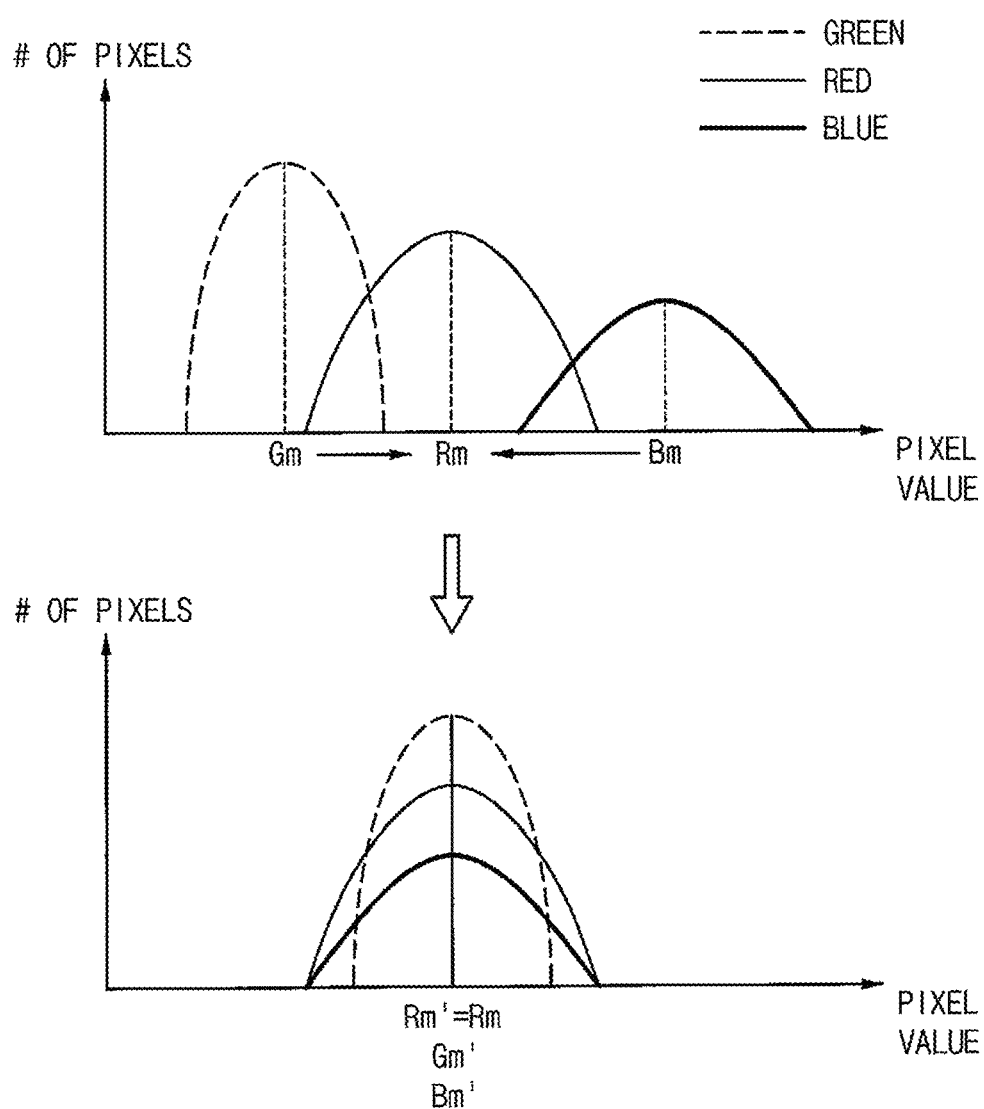
FIG. 11 is a diagram illustrating an example embodiment of generating offset color pixel values with respect to the local window of FIG. 10.

FIG. 10 is a diagram illustrating an example embodiment of a local window when a target pixel corresponds to a red pixel in a Bayer pattern, and FIG. 11 is a diagram illustrating an example embodiment of generating offset color pixel values with respect to the local window of FIG. 10.

Referring to FIG. 10, a local window WIN_R of a 5*5 pixel area may include nine red pixels R, twelve green pixels G and four blue pixels B and the target pixel corresponds to a red pixel R.

For example, denoising may be performed in the domain of the color filter array to enhance the demosaicing performance. In this case, general denoising schemes use the neighboring pixels corresponding to the same color as the target pixel. According to the probability theory, the standard deviation ($\sigma$) of the noise may be reduced by a ratio $\sigma/\sqrt{N}$ where N is the number of pixels used in averaging. Accordingly, the number of pixels used in denoising directly affects the denoising performance.

In the case of the local window WIN_R of FIG. 10, the number of the red pixels corresponding to the color of the target pixel is nine, and the standard deviation of the noise may be reduced by the ratio of $1/3$ when the color pixels of the same color as the target pixel are used in denoising. In contrast, all color pixels in the local window WIN_R are used in denoising according to example embodiments. The number of all color pixels in the local window WIN_R is 25, the standard deviation of the noise may be reduced by the ratio of $1/5$, and the denoising performance may be enhanced higher than the conventional schemes. However, the color distortion may be caused when the averages of the respective color pixel values are different from each other. The color distortion may be reduced by considering differences between average color pixel values according to example embodiments.

The distributions of the color pixel values in the local window WIN_R are illustrated in the upper portion of FIG. 11 and the distributions of the offset color pixel values after the conversion according to example embodiments are illustrated in the lower portion of FIG. 11.

As illustrated in FIG. 11, the average values Rm', Gm' and Bm' of the offset color pixel values are equal to a target color average value Rm that is the local color average value corresponding to a color (that is, the red color) of the target pixel (that is, the red pixel R).

When the target pixel is the red pixel R, the conversion of color pixel values to the offset color pixel values may be represented by Expression 5. As a result, the average values per color are the same, and only the variations in the color pixel values per color are different in the distributions of the offset color pixel values as illustrated in the lower portion of FIG. 11. For example, the variation in the color pixel values corresponding to the green pixels may be less than the variation in the color pixel values corresponding to the red and blue pixels.

R'=R

G'=G+OFSrg $$B'=B+\text{OFSrb}$$

$$\text{OFSrg}=Rm-Gm$$

$$\text{OFSrb}=Rm-Bm \quad \text{Expression 5}$$

In Expression 5, R, G and B indicate the red pixel value, the green pixel value and the blue pixel value respectively, R', G' and B' indicate the offset red pixel value, the offset green pixel value and the offset blue pixel value respectively, Rm, Gm and Bm indicate the local red average value, the local green average value and the local blue average value respectively, OFSrg and OFSrb indicate a green offset value and a blue offset value respectively when the target pixel is the red pixel.

When denoising is performed using the offset color pixel values that are converted as Expression 5, the offsets due to the color difference may be compensated for, and ideally there remains only the difference due to the variations of the noise distributions. In general, the noise model of the image captured by an image sensor is represented by the Gaussian and Poisson distributions. Accordingly, denoising using the all color pixel values may be validated through the conversion of Expression 5. The average value of the offset color pixel values corresponding to each color may be maintained to be equal to the target color average value that is the local color average value corresponding to the color of the target pixel, and thus the color distortion during denoising may be prevented or reduced.

Figure 12:
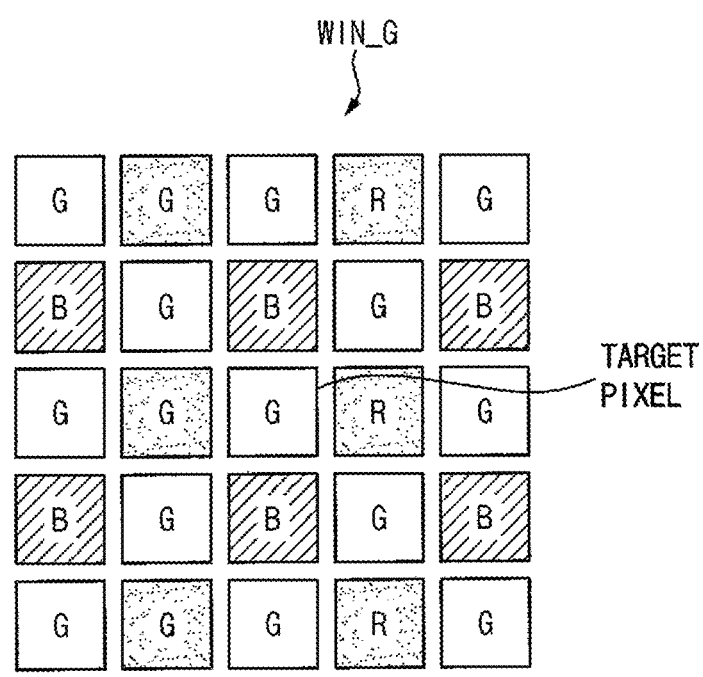
FIG. 12 is a diagram illustrating an example embodiment of a local window when a target pixel corresponds to a green pixel in a Bayer pattern.
Figure 13:
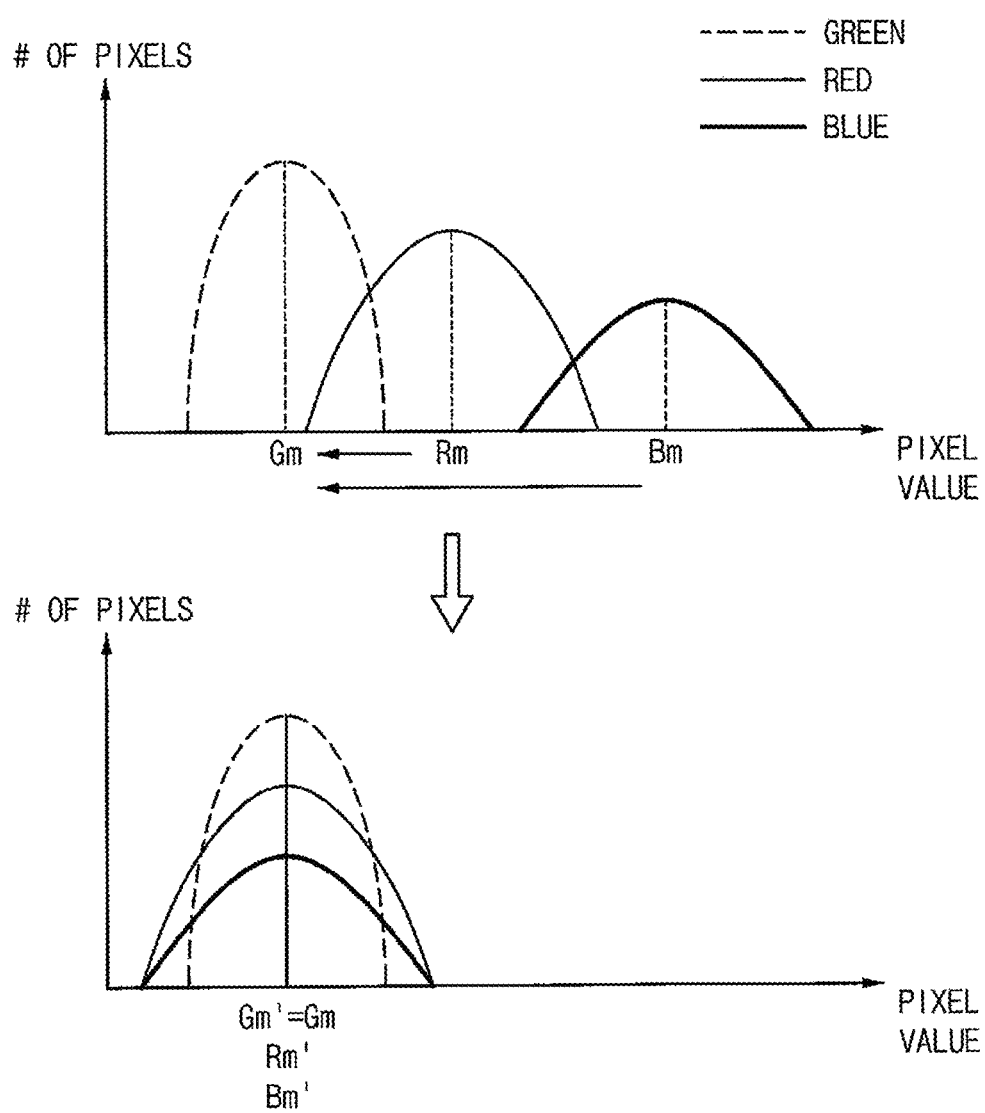
FIG. 13 is a diagram illustrating an example embodiment of generating offset color pixel values with respect to the local window of FIG. 12.

FIG. 12 is a diagram illustrating an example embodiment of a local window when a target pixel corresponds to a green pixel in a Bayer pattern, and FIG. 13 is a diagram illustrating an example embodiment of generating offset color pixel values with respect to the local window of FIG. 12. The descriptions repeated with FIGS. 10 and 11 are omitted.

Referring to FIG. 12, a local window WIN_G of a 5*5 pixel area may include thirteen green pixels G, six red pixels R and six blue pixels B and the target pixel corresponds to a green pixel G.

The distributions of the color pixel values in the local window WIN_G are illustrated in the upper portion of FIG. 13 and the distributions of the offset color pixel values after the conversion according to example embodiments are illustrated in the lower portion of FIG. 13.

As illustrated in FIG. 13, the average values Rm', Gm' and Bm' of the offset color pixel values are equal to a target color average value Gm that is the local color average value corresponding to a color (that is, the green color) of the target pixel (that is, the green pixel G).

When the target pixel is the green pixel G, the conversion of color pixel values to the offset color pixel values may be represented by Expression 6. As a result, the average values per color are the same and only the variations in the color pixel values per color are different in the distributions of the offset color pixel values as illustrated in the lower portion of FIG. 13. For example, the variation in the color pixel values corresponding to the green pixels may be less than the variation in the color pixel values corresponding to the red and blue pixels.

$$R'=R+\text{OFSgr}$$

$$G'=G$$

$$B'=B+\text{OFSgb}$$

$$\text{OFSgr}=Gm-Rm$$

$$\text{OFSgb}=Gm-Bm \quad \text{Expression 6}$$

In Expression 6, R, G and B indicate the red pixel value, the green pixel value and the blue pixel value respectively, R', G' and B' indicate the offset red pixel value, the offset green pixel value and the offset blue pixel value respectively, Rm, Gm and Bm indicate the local red average value, the local green average value and the local blue average value respectively, OFSgr and OFSgb indicate a red offset value and a blue offset value when the target pixel is the green pixel.

Figure 14:
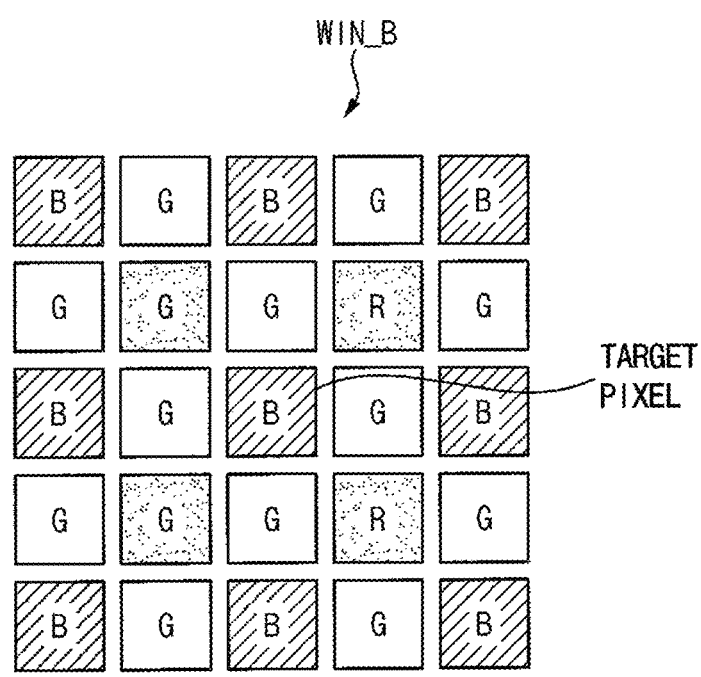
FIG. 14 is a diagram illustrating an example embodiment of a local window when a target pixel corresponds to a blue pixel in a Bayer pattern.
Figure 15:
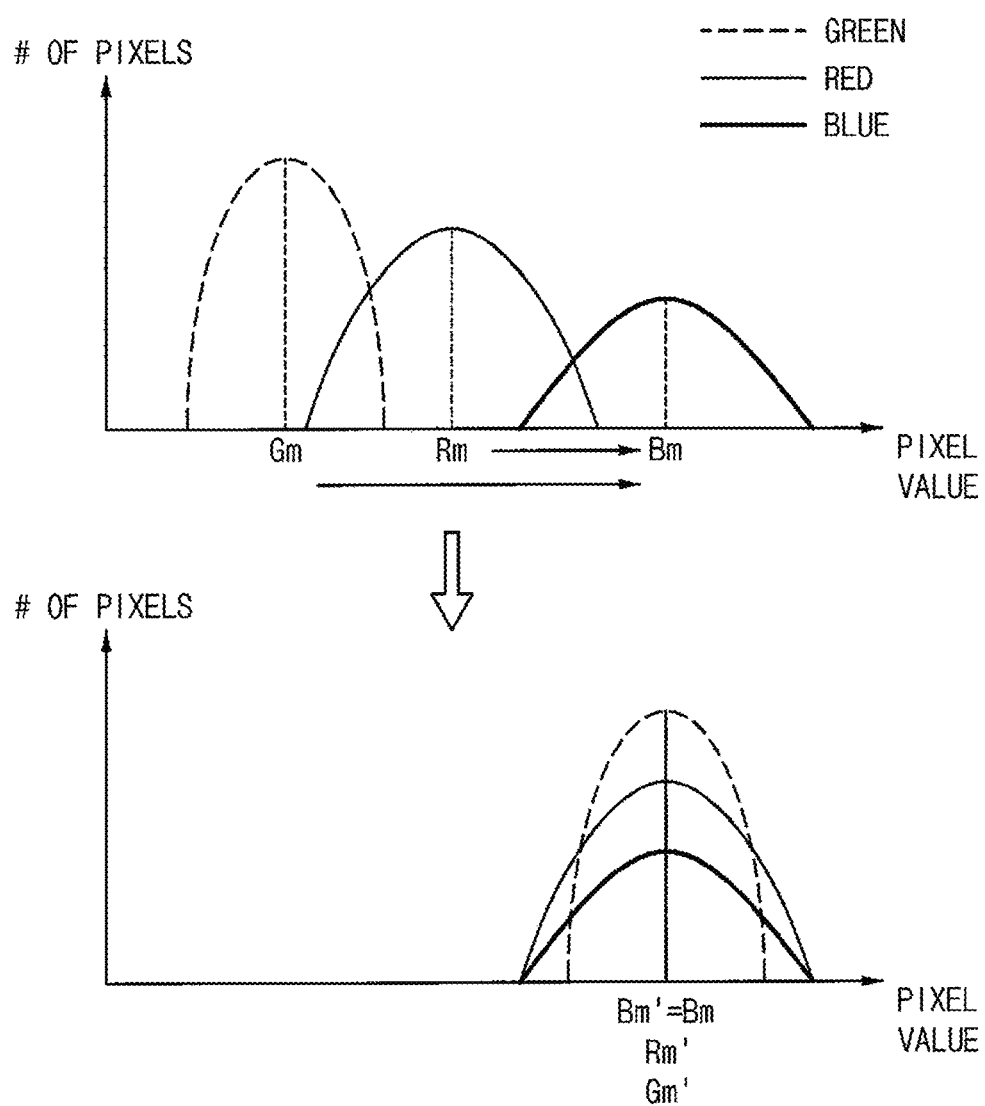
FIG. 15 is a diagram illustrating an example embodiment of generating offset color pixel values with respect to the local window of FIG. 14.

FIG. 14 is a diagram illustrating an example embodiment of a local window when a target pixel corresponds to a blue pixel in a Bayer pattern, and FIG. 15 is a diagram illustrating an example embodiment of generating offset color pixel values with respect to the local window of FIG. 14.

Referring to FIG. 14, a local window WIN_B of a 5*5 pixel area may include nine blue pixels B, four red pixels R and twelve green pixels G and the target pixel corresponds to a blue pixel B.

The distributions of the color pixel values in the local window WIN_B are illustrated in the upper portion of FIG. 15 and the distributions of the offset color pixel values after the conversion according to example embodiments are illustrated in the lower portion of FIG. 15.

As illustrated in FIG. 15, the average values Rm', Gm' and Bm' of the offset color pixel values are equal to a target color average value Bm that is the local color average value corresponding to a color (that is, the blue color) of the target pixel (that is, the blue pixel B).

When the target pixel is the blue pixel B, the conversion of color pixel values to the offset color pixel values may be represented by Expression 7. As a result, the average values per color are the same and only the variations in the color pixel values per color are different in the distributions of the offset color pixel values as illustrated in the lower portion of FIG. 15. For example, the variation in the color pixel values corresponding to the green pixels may be less than the variation in the color pixel values corresponding to the red and blue pixels.

$$R'=R+\text{OFSbr}$$

$$G'=G+\text{OFSbg}$$

$$B'=B$$

$$\text{OFSbr}=Bm-Rm$$

$$\text{OFSbg}=Bm-Gm \quad \text{Expression 7}$$

In Expression 7, R, G and B indicate the red pixel value, the green pixel value and the blue pixel value respectively, R', G' and B' indicate the offset red pixel value, the offset green pixel value and the offset blue pixel value respectively, Rm, Gm and Bm indicate the local red average value, the local green average value and the local blue average value respectively, OFSbr and OFSbg indicate a red offset value and a green offset value when the target pixel is the blue pixel.

Figure 16:
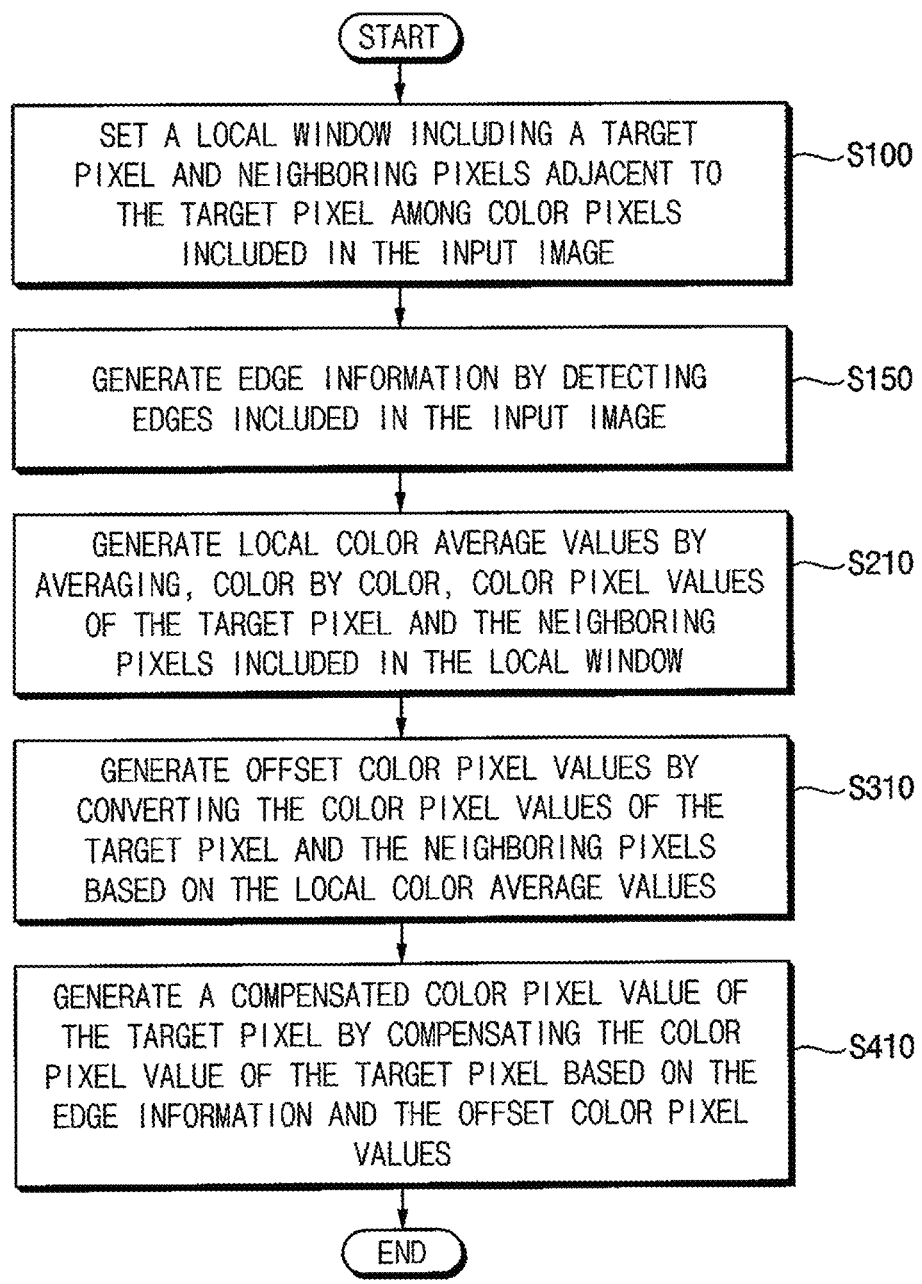
FIG. 16 is a flowchart illustrating a denoising method according to example embodiments.
Figure 17:
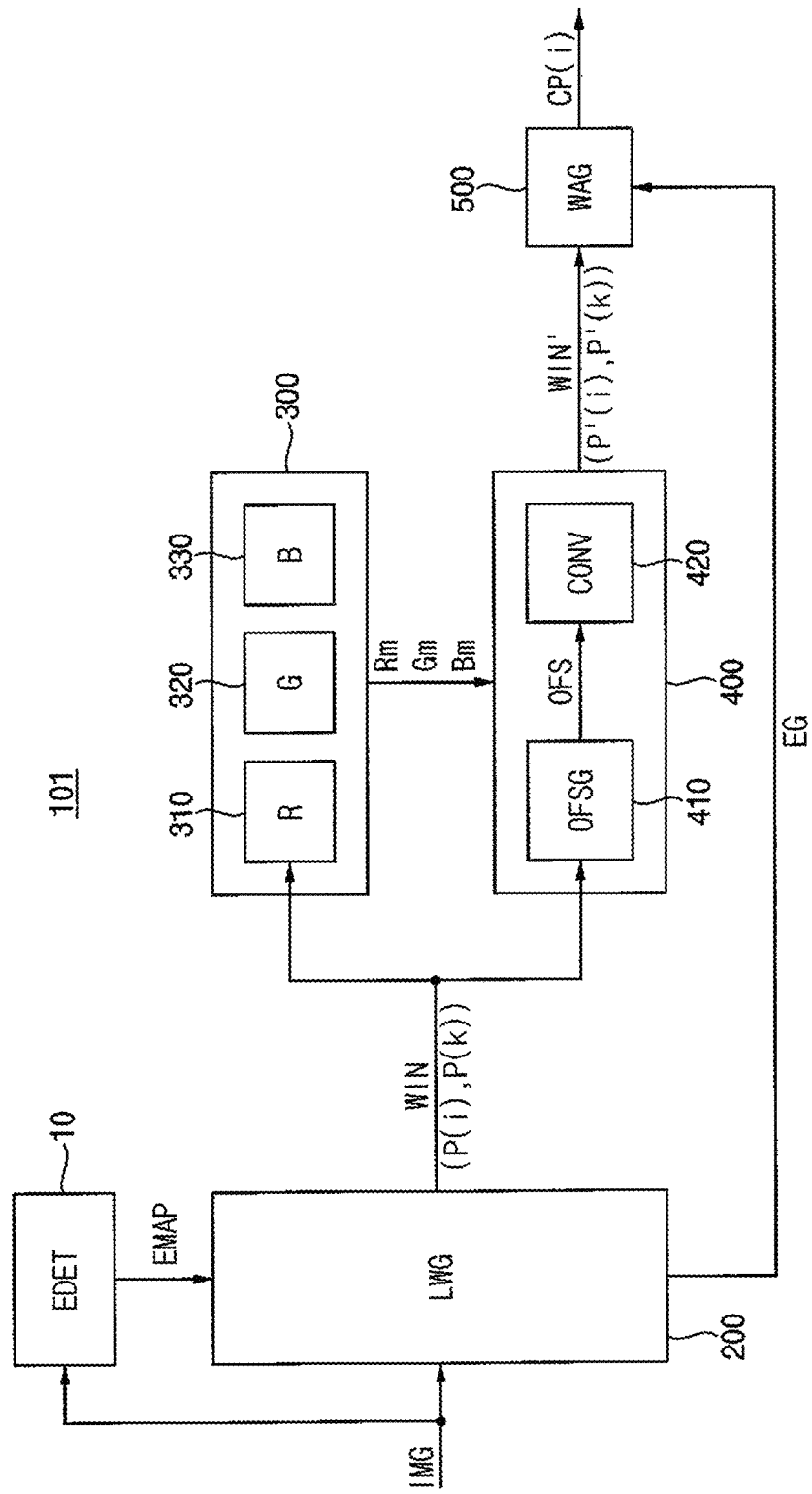
FIG. 17 is a block diagram illustrating a denoising device according to example embodiments.

FIG. 16 is a flowchart illustrating a denoising method according to example embodiments, and FIG. 17 is a block diagram illustrating a denoising device according to example embodiments. A method of FIG. 16 is substantially the same as the method of FIG. 1 and a denoising device 101 of FIG. 17 is substantially the same as the denoising device 100 of FIG. 8, except for edge detection. The descriptions repeated with respect to FIGS. 1 through 15 may be omitted.

Referring to FIG. 17, a denoising device 101 may include an edge detector EDET 10, a local window generator LWG 200, an average value generator 300, a convertor 400 and a compensator WAG 500.

Referring to FIGS. 16 and 17, the local window generator 200 may set a local window WIN including a target pixel P(i) and neighboring pixels P(k) adjacent to the target pixel P(i) among color pixels included in an input image IMG (S100), and provide color pixel values of the target pixel P(i) and the neighboring pixels P(k).

The edge detector EDET 10 may generate edge information EMAP by detecting edges in the input image IMG (S150). For example, the edge information EMAP may be an edge map as will be described below with reference to FIGS. 18 and 19.

The average value generator 300 may generate local color average values by averaging, color by color, the color pixel values of the target pixel P(i) and the neighboring pixels P(k) included in the local window WIN (S210).

The converter 400 may generate offset color pixel values P'(i) and P'(k) by converting the color pixel values of the target pixel P(i) and the neighboring pixels P(k) based on the local color average values Rm, Gm and Bm (S310).

The compensator 500 may generate a compensated color pixel value CP(i) of the target pixel P(i) by compensating the color pixel value of the target pixel P(i) based on the edge information EMAP and the offset color pixel values P'(i) and P'(k) (S410).

Figure 18:
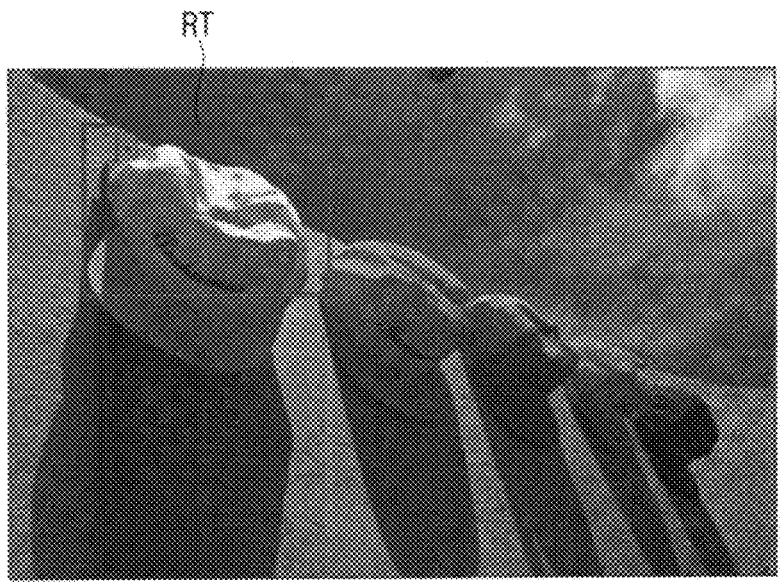
FIG. 18 is a diagram illustrating an example of an input image.
Figure 19:
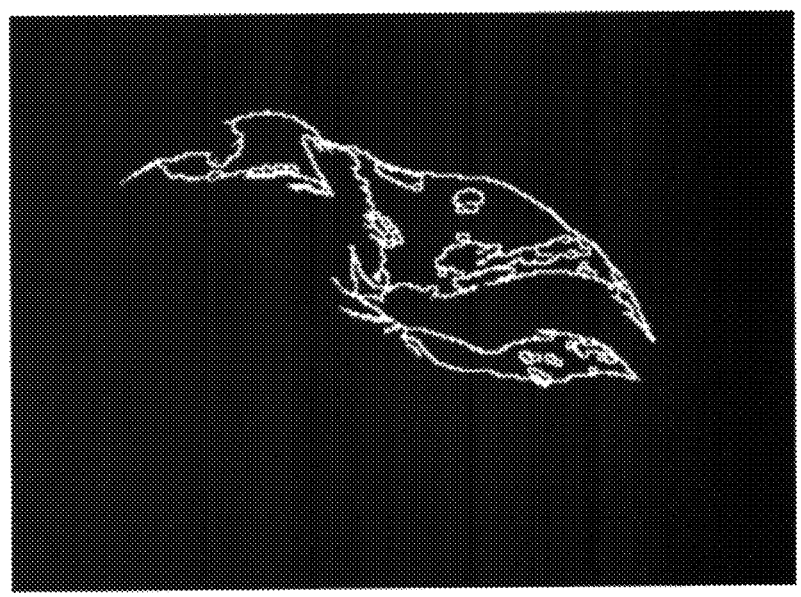
FIG. 19 is a diagram illustrating an edge image corresponding to the input image of FIG. 18.

FIG. 18 is a diagram illustrating an example of an input image, and FIG. 19 is a diagram illustrating an edge image corresponding to the input image of FIG. 18. FIG. 19 illustrates an edge map of the edge data corresponding to a portion RT of the input image of FIG. 18.

The edge detector 10 may generate the edge information EMAP corresponding to the input image IMG, and the edge information EMAP may be provided in a form of edge map as illustrated in FIG. 10. For example, the edge map may be represented such that the pixels corresponding to the edges may have the value of '1' and the other pixels may have the value of '0'.

The edge detector 10 may be implemented with a filter such as a high-pass filter (HPF) configured to extract the edge information EMAP from the input image IMG. The edge detector 10 may generate the edge information EMAP indicating the edges of the input image IMG using the schemes such as Canny edge detection, and so on.

In some example embodiments, the local window generator 200 in FIG. 17 may generate an edge grade value EG based on the edge information EMAP and provide the edge grade value EG to the compensator 500. The compensator 500 may generate the compensated color pixel value CP(i) of the target pixel P(i) by compensating the color pixel value of the target pixel P(i) based on the edge grade value EG corresponding to the edge information EMAP and the offset color pixel values P'(i) and P'(k).

In some example embodiments, the compensator 500 may generate the compensated color pixel value CP(i) of the target pixel by Expression 8.

$$CP(i) = \frac{\sum_k \omega_i(k) \cdot P'(k) \cdot E_i(k)}{\sum_k \omega_i(k) \cdot E_i(k)} \quad \text{Expression 8}$$

$$E_i(k) = \begin{cases} 1 - EG, & \text{if } P(i) \text{ and } P'(k) \text{ correspond to different colors} \\ 1, & \text{if } P(i) \text{ and } P'(k) \text{ correspond to same color} \end{cases}$$

In Expression 8, $\Sigma k$ indicates a sum with respect to all of the target pixel and the neighboring pixels in the local window, P'(k) indicates each offset color pixel value, $\omega i(k)$ indicates each weight value corresponding to each offset color pixel value, and EG indicates an edge grade value that is determined during detecting the edges. The edge grade value EG may be determined by units of a color pixel or a local window.

Figure 20:
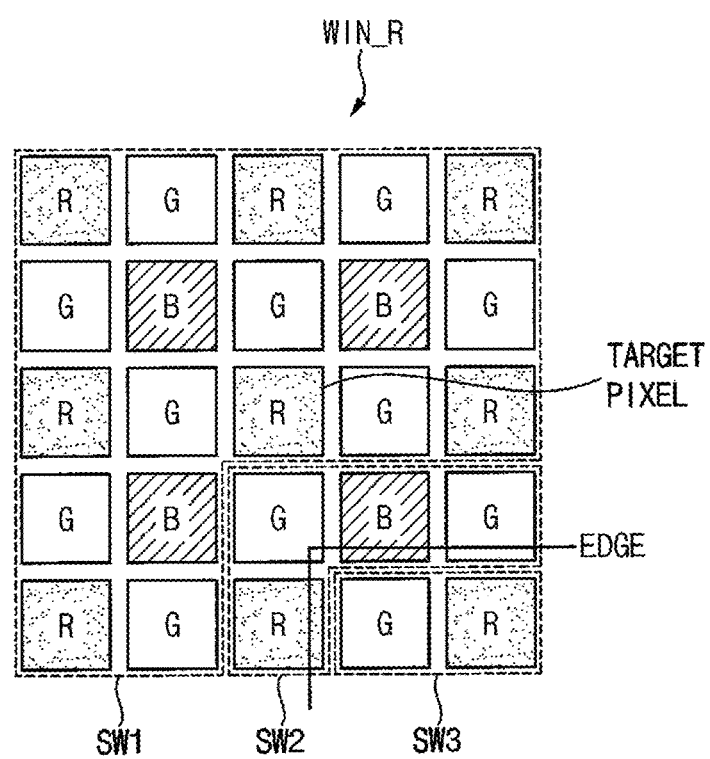
FIG. 20 is a diagram illustrating an example embodiment of a local window when a target pixel corresponds to a red pixel in a Bayer pattern.

FIG. 20 is a diagram illustrating an example embodiment of a local window when a target pixel corresponds to a red pixel in a Bayer pattern.

Referring to FIG. 20, a local window WIN_R of a 5*5 pixel area may include nine red pixels R, twelve green pixels G and four blue pixels B and the target pixel corresponds to a red pixel R.

For example, the local window WIN_R may be divided into sub windows SW1, SW2 and SW3 by the edges as boundaries. In this case, the average value generator 300 in FIG. 17 may generate the local color average values by averaging, color by color, the color pixel values included in a target sub window SW1 in which the target pixel is included. The compensator 500 may generate the compensated color pixel value by compensating the color pixel value of the target pixel based on the offset color pixel values included in the target sub window SW1.

In general, the pixel values are changed relatively largely near the edges. Accordingly, the color pixel values in the sub window SW2 corresponding to the edge and the color pixel values in the sub window SW3 in which the target pixel is not included may be excluded in denoising.

Figure 21:
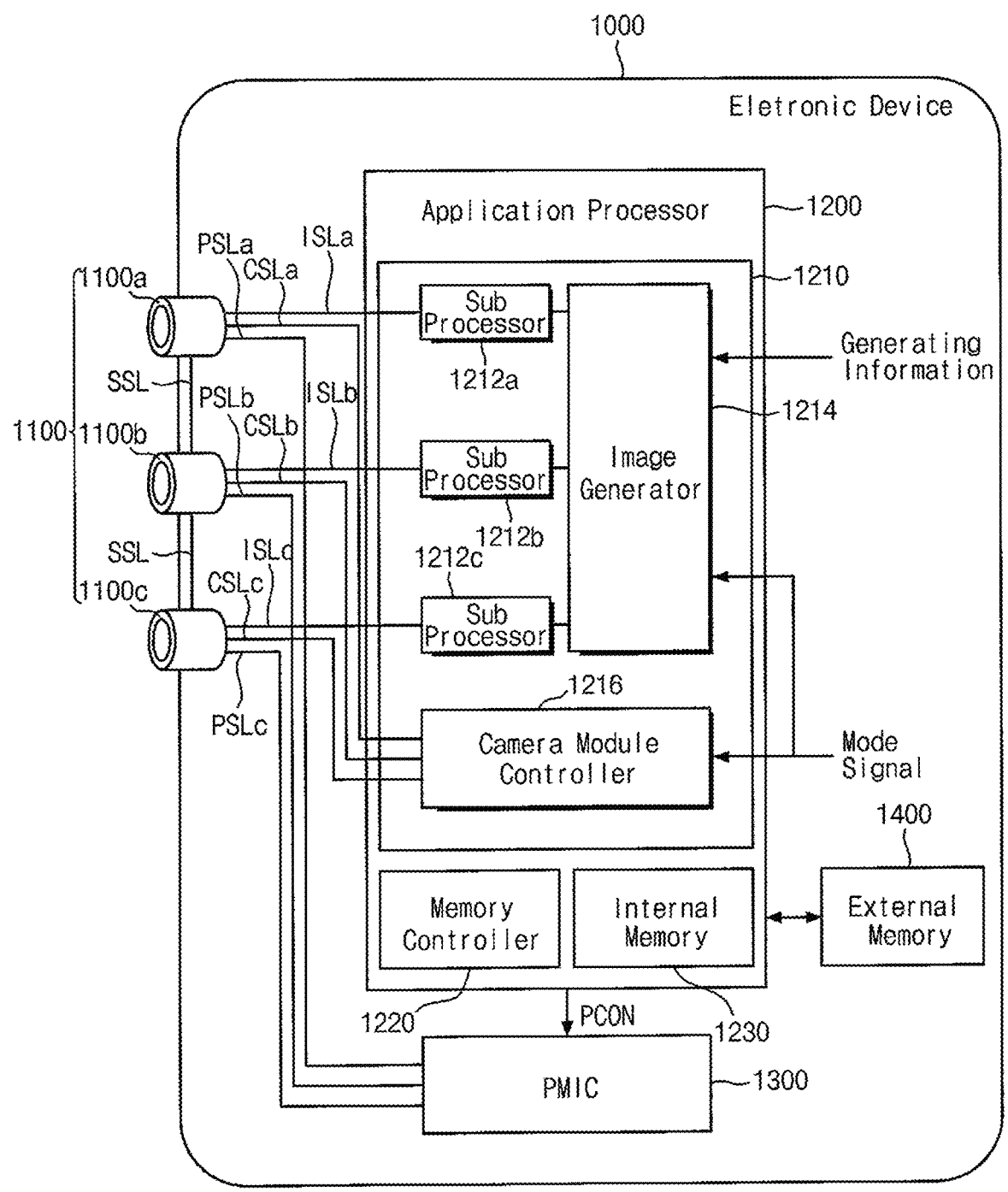
FIG. 21 is a block diagram illustrating an electronic device according to example embodiments.
Figure 22:
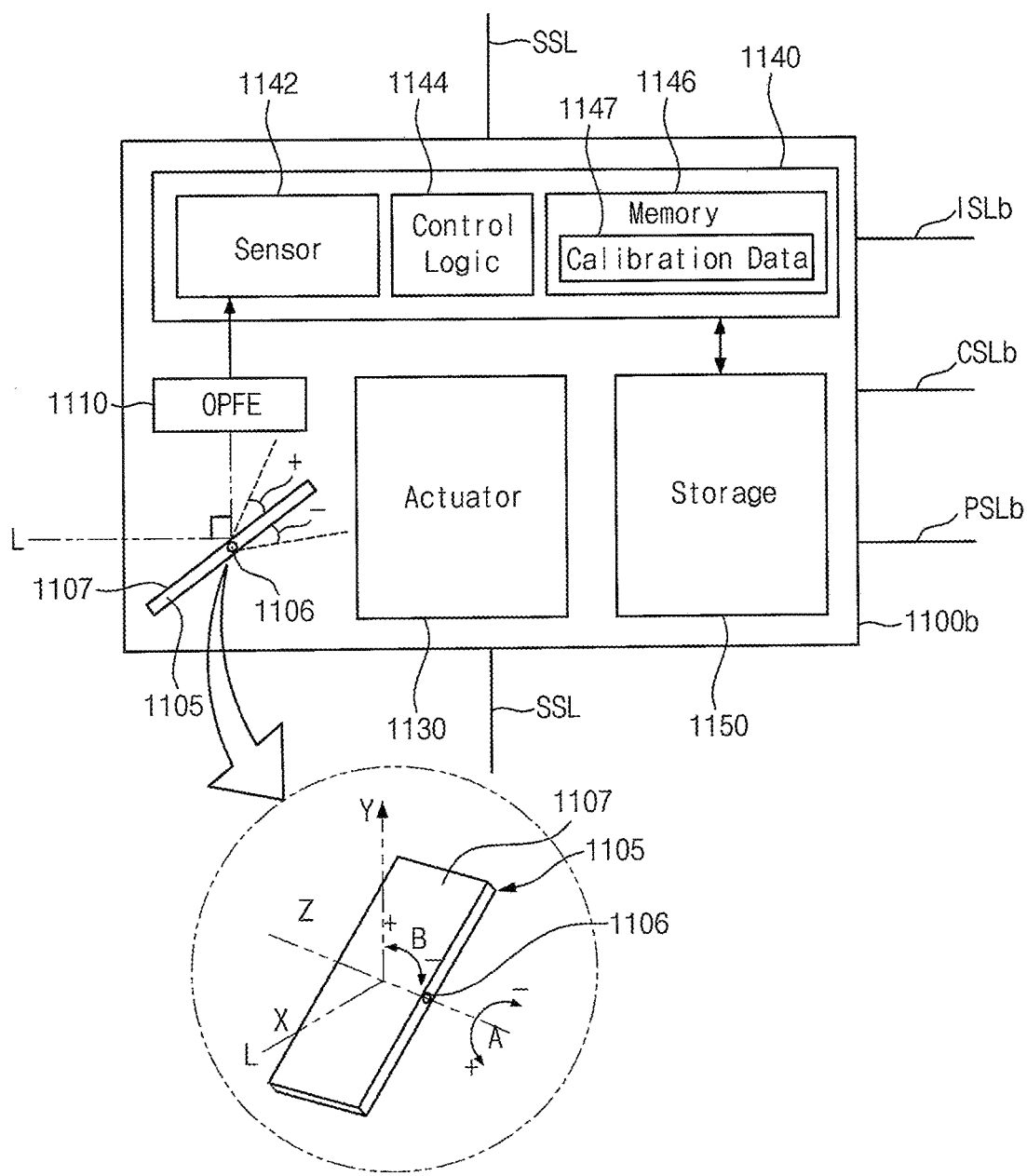
FIG. 22 is a block diagram illustrating a camera module included in the electronic device of FIG. 21.

FIG. 21 is a block diagram illustrating an electronic device 1000 according to example embodiments, and FIG. 22 is a block diagram illustrating a camera module included in the electronic device of FIG. 21.

Referring to FIG. 21, the electronic device 1000 may include a camera module group 1100, and application processor 1200, a power management integrated circuit (PMIC) 1300 and an external memory 1400.

The camera module group 1100 may include a plurality of camera modules 1100a, 1100b and 1100c. FIG. 21 illustrates the three camera modules 1100a, 1100b and 1100c as an example, but example embodiments are not limited to a particular number of camera modules. According to example embodiments, the camera module group 1100 may include two camera modules, and four or more camera modules.

Hereinafter, an example configuration of the camera module 1100b is described with reference to FIG. 22. According to example embodiments, the same descriptions may be applied to the other camera modules 1100a and 1100c.

Referring to FIG. 22, the camera module 1100b may include a prism 1105, an optical path folding element (OPFE) 1110, an actuator 1130, an image sensing device 1140 and a storage device 1150.

The prism 1105 may include a reflection surface 1107 to change a path of a light L incident on the prism 1105.

In some example embodiments, the prism 1105 may change the path of the light L incident in a first direction X to the path in a second direction Y perpendicular to the first direction X. In addition, the prism 1105 may rotate the reflection surface 1107 around a center axis 1106 and/or rotate the center axis 1106 in the B direction to align the path of the reflected light along the second direction Y. In addition, the OPFE 1110 may move in a third direction perpendicular to the first direction X and the second direction Y.

In some example embodiments, a rotation angle of the prism 1105 may be smaller than 15 degrees in the positive (+) A direction and greater than 15 degrees in the negative (−) A direction, but example embodiments are not limited thereto.

In some example embodiments, the prism 1105 may rotate within 20 degrees in the positive B direction and the negative B direction.

In some example embodiments, the prism 1105 may move the reflection surface 1106 in the third direction Z that is in parallel with the center axis 1106.

The OPFE 1110 may include optical lenses that are divided into m groups where m is a positive integer. The m lens group may move in the second direction Y to change an optical zoom ratio of the camera module 1100b. For example, the optical zoom ratio may be changed in a range of 3K, 5K, and so on by moving the m lens group, when K is a basic optical zoom ratio of the camera module 1100b.

The actuator 1130 may move the OPFE 1110 or the optical lens to a specific position. For example, the actuator 1130 may adjust the position of the optical lens for accurate sensing such that an image sensor 1142 may be located at a position corresponding to a focal length of the optical lens.

The image sensing device 1140 may include the image sensor 1142, a control logic 1144 and a memory 1146. The image sensor 1142 may capture or sense an image using the light provided through the optical lens. The control logic 1144 may control overall operations of the camera module 1100b. For example, the control logic 1144 may provide control signals through control signal line CSLb to control the operation of the camera module 1100b.

The memory 1146 may store information such as calibration data 1147 for the operation of the camera module 1100b. For example, the calibration data 1147 may include information for generation of image data based on the provided light, such as information on the above-described rotation angle, a focal length, information on an optical axis, and so on. When the camera module 1100b is implemented as a multi-state camera having a variable focal length depending on the position of the optical lens, the calibration data 1147 may include multiple focal length values and auto-focusing values corresponding to the multiple states.

The storage device 1150 may store the image data sensed using the image sensor 1142. The storage device 1150 may be disposed outside of the image sensing device 1140, and the storage device 1150 may be stacked with a sensor chip comprising the image sensing device 1140. The storage device 1150 may be implemented with an electrically erasable programmable read-only memory (EEPROM), but example embodiments are not limited thereto.

Referring to FIGS. 21 and 22, each of the camera modules 1100a, 1100b and 1100c may include the actuator 1130. In this case, the camera modules 1100a, 1100b and 1100c may include the same or different calibration data 1147 depending on the operations of the actuators 1130.

In some example embodiments, one camera module 1100b may have a folded lens structure included the above-described prism 1105 and the OPFE 1110, and the other camera modules 1100a and 1100b may have a structure without the prism 1105 and the OPFE 1110.

In some example embodiments, one camera module 1100c may be a depth camera configured to measure distance information of an object using an infrared light. In this case, the application processor 1200 may merge the distance information provided from the depth camera 1100c and image data provided from the other camera modules 1100a and 1100b to generate a three-dimensional depth image.

In some example embodiments, at least two camera modules among the camera modules 1100a, 1100b and 1100c may have different field of views, for example, through different optical lenses.

In some example embodiments, each of the camera modules 1100a, 1100b and 1100c may be separated physically from each other. In other words, the camera modules 1100a, 1100b and 1100c may each include a dedicated image sensor 1142.

The application processor 1200 may include an image processing device 1210, a memory controller 1220 and an internal memory 1230. The application processor 1200 may be separated from the camera modules 1100a, 1100b and 1100c. For example, the application processor 1200 may be implemented as one chip and the camera modules 1100a, 1100b and 1100c may implemented as another chip or other chips.

The image processing device 1210 may include a plurality of sub processors 1212a, 1212b and 1212c, an image generator 1214 and a camera module controller 1216.

The image data generated by the camera modules 1100a, 1100b and 1100c may be provided to the sub processors 1212a, 1212b and 1212c through distinct image signal lines ISLa, ISLb and ISLc, respectively. For example, the transfer of the image data may be performed using a camera serial interface (CSI) based on the mobile industry processor interface (MIPI), but example embodiments are not limited thereto.

In some example embodiments, one sub processor may be assigned commonly to two or more camera modules. In this case, a multiplexer may be used to transfer the image data selectively from one of the camera modules to the shared sub processor.

The image data from the sub processors 1212a, 1212b and 1212c may be provided to the image generator 1214. The image generator 1214 may generate an output image using the image data from the sub processors 1212a, 1212b and 1212c according to image generating information or a mode signal (e.g., indicating an operation mode of the electronic device). For example, the image generator 1214 may merge at least a portion of the image data from the camera modules 1100a, 1100b and 1100c having the different fields of view to generate the output image according to the image generating information or the mode signal. In addition, the image generator 1214 may select, as the output image, one of the image data from the camera modules 1100a, 1100b and 1100c according to the image generating information or the mode signal.

In some example embodiments, the image generating information may include a zoom factor or a zoom signal. In some example embodiments, the mode signal may be a signal based on a selection of a user.

When the image generating information is the zoom factor and the camera modules 1100a, 1100b and 1100c have the different field of views, the image generator 1214 may perform different operations depending on the zoom signal. For example, when the zoom signal is a first signal, the image generator 1214 may merge the image data from the different camera modules to generate the output image. When the zoom signal is a second signal different from the first signal, the image generator 1214 may select, as the output image, one of image data from the camera modules 1100a, 1100b and 1100c.

In some example embodiments, the image generator 1214 may receive the image data of different exposure times from the camera modules 1100a, 1100b and 1100c. In this case, the image generator 1214 may perform high dynamic range (HDR) processing with respect to the image data from the camera modules 1100a, 1100b and 1100c to generate the output image having the increased dynamic range.

The camera module controller 1216 may provide control signals to the camera modules 1100a, 1100b and 1100c. The control signals generated by the camera module controller 1216 may be provided to the camera modules 1100a, 1100b and 1100c through the distinct control signal lines CSLa, CSLb and CSLc, respectively.

In some example embodiments, one of the camera modules 1100a, 1100b and 1100c may be designated as a master camera according to the image generating information or the mode signal, and the other camera modules may be designated as slave cameras.

The camera module acting as the master camera may be changed according to the zoom factor or an operation mode signal. For example, when the camera module 1100a has the wider field of view than the camera module 1100b and the zoom factor indicates a lower zoom magnification, the camera module 1100b may be designated as the master camera. In contrast, when the zoom factor indicates a higher zoom magnification, the camera module 1100a may be designated as the master camera.

In some example embodiments, the control signals provided from the camera module controller 1216 may include a synch enable signal. For example, when the camera module 1100b is the master camera and the camera modules 1100a and 1100c are the slave cameras, the camera module controller 1216 may provide the synch enable signal to the camera module 1100b. The camera module 1100b may generate a synch signal based on the provided synch enable signal and provide the synch signal to the camera modules 1100a and 1100c through a synch signal line SSL. As such, the camera modules 1100a, 1100b and 1100c may transfer the synchronized image data to the application processor 1200 based on the synch signal.

In some example embodiments, the control signals provided from the camera module controller 1216 may include information on the operation mode. The camera modules 1100a, 1100b and 1100c may operate in a first operation mode or a second operation mode based on the information from the camera module controller 1216.

In the first operation mode, the camera modules 1100a, 1100b and 1100c may generate image signals with a first speed (e.g., a first frame rate) and encode the image signals with a second speed higher than the first speed (e.g., a second frame rate higher than the first frame rate) to transfer the encoded image signals to the application processor 1200. The second speed may be lower than thirty times the first speed. The application processor 1200 may store the encoded image signals in the internal memory 1230 or the external memory 1400. The application processor 1200 may read out and decode the encoded image signals to provide display data to a display device. For example, the sub processors 1212a, 1212b and 1212c may perform the decoding operation and the image generator 1214 may process the decoded image signals.

In the second operation mode, the camera modules 1100a, 1100b and 1100c may generate image signals with a third speed lower than the first speed (e.g., the third frame rate lower than the first frame rate) to transfer the generated image signals to the application processor 1200. In other words, the image signals that are not encoded may be provided to the application processor 1200. The application processor 1200 may process the received image signals or store the receive image signals in the internal memory 1230 or the external memory 1400.

The PMIC 1300 may provide a power supply voltage to the camera modules 1100a, 1100b and 1100c, respectively. For example, the PMIC 1300 may provide, under control of the application processor 1200, a first power to the camera module 1100a through a power line PSLa, a second power to the camera module 1100b through a power line PSLb, and a third power to the camera module 1100c through a power line PSLc.

The PMIC 1300 may generate the power respectively corresponding to the camera modules 1100a, 1100b and 1100c and control power levels, in response to a power control signal PCON from the application processor 1200. The power control signal PCON may include information on the power depending on the operation modes of the camera modules 1100a, 1100b and 1100c. For example, the operation modes may include a low power mode in which the camera modules 1100a, 1100b and 1100c operate with a low power level. The power levels of the camera modules 1100a, 1100b and 1100c may be the same as or different from each other. In addition, the power levels may be changed dynamically or adaptively.

As described above, the denoising method and the denoising device according to example embodiments may enhance noise reduction performance by adjusting the color pixel value of the target pixel in accordance with the color pixel values corresponding to all colors included in the local window regardless of the color of the target pixel. In addition, the denoising method and the denoising device according to example embodiments may enhance the noise reduction performance without color distortion by generating the offset color pixel values based on the local color average values and adjusting the color pixel values of the target pixel based on the offset color pixel values.

The present disclosure may be applied to electronic devices and systems including an image sensor. For example, the present disclosure may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a vehicle navigation device, a video phone, a monitoring system, an auto focusing system, a tracking system, a motion detection system, etc.

The foregoing is illustrative of example embodiments of the present disclosure and is not to be construed as limiting thereof. Although a few example embodiments have been described, those skilled in the art will readily appreciate that many modifications are possible in the example embodiments without materially departing from the present disclosure.

What is claimed is:

1. A method of reducing noise in an input image corresponding to a color filter array of an image sensor, the method comprising:
    setting, as a local window among color pixels included in the input image, a target pixel and neighboring pixels adjacent to the target pixel;
    determining color pixel values for the target pixel and each of the neighboring pixels included in the local window;
    generating local color average values by averaging, color by color, the color pixel values;

generating offset color pixel values by converting the color pixel values of the target pixel and the neighboring pixels based on the local color average values; and generating a compensated color pixel value of the target pixel by adjusting the color pixel value of the target pixel based on the offset color pixel values.

2. The method of claim 1, wherein the compensated color pixel value of the target pixel is generated based on all of the color pixel values corresponding to the same color as the target pixel and the color pixel values corresponding to colors different from the color of the target pixel.

3. The method of claim 1, wherein an average value of the offset color pixel values corresponding to each color is equal to a target color average value, wherein the target color average value is the local color average value corresponding to the color of the target pixel.

4. The method of claim 1, wherein generating the offset color pixel values includes:
generating each of color offset values by subtracting each of the local color average values from a target color average value, wherein the target color average value is the local color average value corresponding to the color of the target pixel; and
generating each of the offset color pixel values by adding each of the color pixel values of the target pixel and the neighboring pixels to each of the color offset values.

5. The method of claim 1, wherein offset color pixel values corresponding to the same color as the target pixel is equal to the color pixel values before converting the color pixel values.

6. The method of claim 1, wherein generating the compensated color pixel value of the target pixel includes:
generating weight values respectively corresponding to the offset color pixel values;
generating a weighted average value by applying the weight values to the offset color pixel values with respect to all of the target pixel and the neighboring pixels in the local window; and
providing the weighted average value as the compensated color pixel value of the target pixel.

7. The method of claim 6, wherein each of the weight values is obtained by the following expression $$\omega_i(k) = e^{-\frac{|P(i)-P'(k)|}{h}}$$

where P(i) indicates the color pixel value of the target pixel, P'(k) indicates each offset color pixel value, h indicates a noise reduction strength, and ωi(k) indicates each weight value corresponding to each offset color pixel value.

8. The method of claim 1, wherein the input image has a Bayer pattern that includes red pixel values of red pixels, green pixel values of green pixels and blue pixel values of blue pixels, and
wherein generating the local color average values includes:
generating a local red average value by averaging the red pixel values included in the local window;
generating a local green average value by averaging the green pixel values included in the local window; and
generating a local blue average value by averaging the blue pixel values included in the local window.

9. The method of claim 8, wherein generating the offset color pixel values includes:
when the target pixel is a red pixel, generating the offset color pixel values including an offset red pixel value, an offset green pixel value and an offset blue pixel value by the following expression $R'=R$ $G'=G+OFSrg$ $B'=B+OFSrb$ $OFSrg=Rm-Gm$ $OFSrb=Rm-Bm$ wherein R, G and B indicate the red pixel value, the green pixel value and the blue pixel value respectively, R', G' and B' indicate the offset red pixel value, the offset green pixel value and the offset blue pixel value respectively, Rm, Gm and Bm indicate the local red average value, the local green average value and the local blue average value respectively, OFSrg and OFSrb indicate a green offset value and a blue offset value respectively.

10. The method of claim 8, wherein generating the offset color pixel values includes:
when the target pixel is a green pixel, generating the offset color pixel values including an offset red pixel value, an offset green pixel value and an offset blue pixel value by following expression $R'=R+OFSgr$ $G'=G$ $B'=B+OFSgb$ $OFSgr=Gm-Rm$ $OFSgb=Gm-Bm$ wherein R, G and B indicate the red pixel value, the green pixel value and the blue pixel value respectively, R', G' and B' indicate the offset red pixel value, the offset green pixel value and the offset blue pixel value respectively, Rm, Gm and Bm indicate the local red average value, the local green average value and the local blue average value respectively, OFSgr and OFSgb indicate a red offset value and a blue offset value respectively.

11. The method of claim 8, wherein generating the offset color pixel values includes:
when the target pixel is the blue pixel, generating the offset color pixel values including an offset red pixel value, an offset green pixel value and an offset blue pixel value by following expression $R'=R+OFSbr$ $G'=G+OFSbg$ $B'=B$ $OFSbr=Bm-Rm$ $OFSbg=Bm-Gm$ wherein R, G and B indicate the red pixel value, the green pixel value and the blue pixel value respectively, R', G' and B' indicate the offset red pixel value, the offset green pixel value and the offset blue pixel value respectively, Rm, Gm and Bm indicate the local red average value, the local green average value and the local blue average value respectively, OFSbr and OFSbg indicate a red offset value and a green offset value respectively.

12. The method of claim 1, further comprising:
generating edge information by detecting edges in the input image,
wherein the compensated color pixel value of the target pixel is generated by adjusting the color pixel value of the target pixel based on the edge information in addition to the offset color pixel values.

13. The method of claim 12, wherein the compensated color pixel value of the target pixel is generated by following expression $$CP(i) = \frac{\sum_k \omega_i(k) \cdot P'(k) \cdot E_i(k)}{\sum_k \omega_i(k) \cdot E_i(k)}$$

$$E_i(k) = \begin{cases} 1 - EG, & \text{if } P(i) \text{ and } P'(k) \text{ correspond to different colors} \\ 1, & \text{if } P(i) \text{ and } P'(k) \text{ correspond to same color} \end{cases}$$

where $\Sigma k$ indicates a sum with respect to all of the target pixel and the neighboring pixels in the local window, P'(k) indicates each offset color pixel value, $\omega i(k)$ indicates each weight value corresponding to each offset color pixel value, and EG indicates an edge grade value that is determined during detecting the edges.

14. The method of claim 12, wherein, when the local window is divided into sub windows by the edges as boundaries, the local color average values are generated by averaging, color by color, the color pixel values included in a target sub window in which the target pixel is included, and the compensated color pixel value of the target pixel is generated by compensating the color pixel value of the target pixel based on the offset color pixel values included in the target sub window.

15. A device for reducing noise in an input image corresponding to a color filter array of an image sensor, the device comprising:
a local window generator configured to
set, as a local window among color pixels included in the input image, a target pixel and neighboring pixels adjacent to the target pixel, and
provide color pixel values for the target pixel and each of the neighboring pixels included in the local window;
an average value generator configured to generate local color average values by averaging, color by color, the color pixel values;
a converter configured to generate offset color pixel values by converting the color pixel values of the target pixel and the neighboring pixels based on the local color average values; and
a compensator configured to generate a compensated color pixel value of the target pixel by adjusting the color pixel value of the target pixel based on the offset color pixel values.

16. The device of claim 15, wherein the compensated color pixel value of the target pixel is generated based on all of the color pixel values corresponding to the same color as the target pixel and the color pixel values corresponding to colors different from the color of the target pixel.

17. The device of claim 15, wherein an average value of the offset color pixel values corresponding to each color is equal to a target color average value, wherein the target color average value is the local color average value corresponding to the color of the target pixel.

18. The device of claim 15, wherein the converter includes:
an offset generator configured to generate each of color offset values by subtracting each of the local color average values from a target color average value, wherein the target color average value is the local color average value corresponding to the color of the target pixel; and
a pixel value converting unit configured to generate each of the offset color pixel values by adding each of the color pixel values of the target pixel and the neighboring pixels to each of the color offset values.

19. The device of claim 15, further comprising:
an edge detector configured to generate edge information by detecting edges in the input image,
wherein the compensated color pixel value of the target pixel is generated by adjusting the color pixel value of the target pixel based on the edge information in addition to the offset color pixel values.

20. A method of reducing noise in an input image corresponding to a color filter array of an image sensor, the method comprising:
setting, as a local window among color pixels included in the input image, a target pixel and neighboring pixels adjacent to the target pixel;
generating edge information by detecting edges included in the input image;
determining color pixel values for the target pixel and each of the neighboring pixels included in the local window;
generating local color average values by averaging, color by color, the color pixel values;
generating offset color pixel values by converting the color pixel values of the target pixel and the neighboring pixels based on the local color average values; and
generating a compensated color pixel value of the target pixel by adjusting the color pixel value of the target pixel based on the edge information and the offset color pixel values.

* * * * *